United States Patent

Popovich, Jr. et al.

[11] Patent Number: 6,011,372
[45] Date of Patent: Jan. 4, 2000

[54] UNIFIED MODULAR SYSTEM OF DRIVES AND CONTROLS FOR MOBILE ROBOTIC APPLICATIONS

[75] Inventors: Joseph G. Popovich, Jr., Canonsburg; Anil N. Rodrigues, Pittsburgh, both of Pa.

[73] Assignee: Weld Tooling Corporation, Pittsburgh, Pa.

[21] Appl. No.: 09/171,441

[22] PCT Filed: Apr. 22, 1997

[86] PCT No.: PCT/US97/06986

§ 371 Date: Oct. 20, 1998

§ 102(e) Date: Oct. 20, 1998

[87] PCT Pub. No.: WO97/40428

PCT Pub. Date: Oct. 30, 1997

Related U.S. Application Data

[60] Provisional application No. 60/016,046, Apr. 22, 1996.

[51] Int. Cl.[7] .................................................. G05B 11/01
[52] U.S. Cl. ........................ 318/560; 318/568.1; 318/569
[58] Field of Search .................................... 318/560–579

[56] References Cited

U.S. PATENT DOCUMENTS

| | | | |
|---|---|---|---|
| 4,464,615 | 8/1984 | Rodi | 318/625 |
| 4,716,349 | 12/1987 | Koyokawa et al. | 318/562 |
| 4,815,013 | 3/1989 | Schmidt | 364/528.39 |
| 4,825,133 | 4/1989 | Tanuma et al. | 318/113 |
| 4,853,602 | 8/1989 | Hommes et al. | 318/38 |
| 4,931,712 | 6/1990 | DiGiulio et al. | 318/625 |
| 4,987,359 | 1/1991 | Saitoh | 318/625 |
| 4,990,839 | 2/1991 | Schonlau | 395/83 |
| 5,013,989 | 5/1991 | Kurakake et al. | 318/625 |
| 5,210,473 | 5/1993 | Backstrand | 318/99 |
| 5,222,017 | 6/1993 | Yellowley et al. | 364/132 |
| 5,239,247 | 8/1993 | Habig et al. | 318/568.18 |
| 5,313,150 | 5/1994 | Arakawa et al. | 318/768 |
| 5,355,059 | 10/1994 | McMillan | 318/103 |
| 5,361,260 | 11/1994 | Mito | 370/452 |
| 5,488,274 | 1/1996 | Satoh | 318/101 |
| 5,581,166 | 12/1996 | Eismann et al. | 318/568.22 |
| 5,619,111 | 4/1997 | Katagiri et al. | 318/625 |
| 5,839,861 | 11/1998 | Schuon | 409/2 |

*Primary Examiner*—Brian Sircus
*Attorney, Agent, or Firm*—Webb Ziesenheim Logsdon Orkin & Hanson, P.C.

[57] ABSTRACT

A unified modular system of drives and controls for a mobile robotic application includes a first control module that covers a full range of commonly used speeds and motions. Second and subsequent drive modules can be chained to the first drive module for more complex motion control. Control modules for different functions can be interchangeably plugged into the first drive module to control lt he first drive module and the second and subsequent drive modules to enable the motor complex motions. The drive modules and control modules include a common bus that enables addition of new functions to create new machines for different applications.

27 Claims, 16 Drawing Sheets

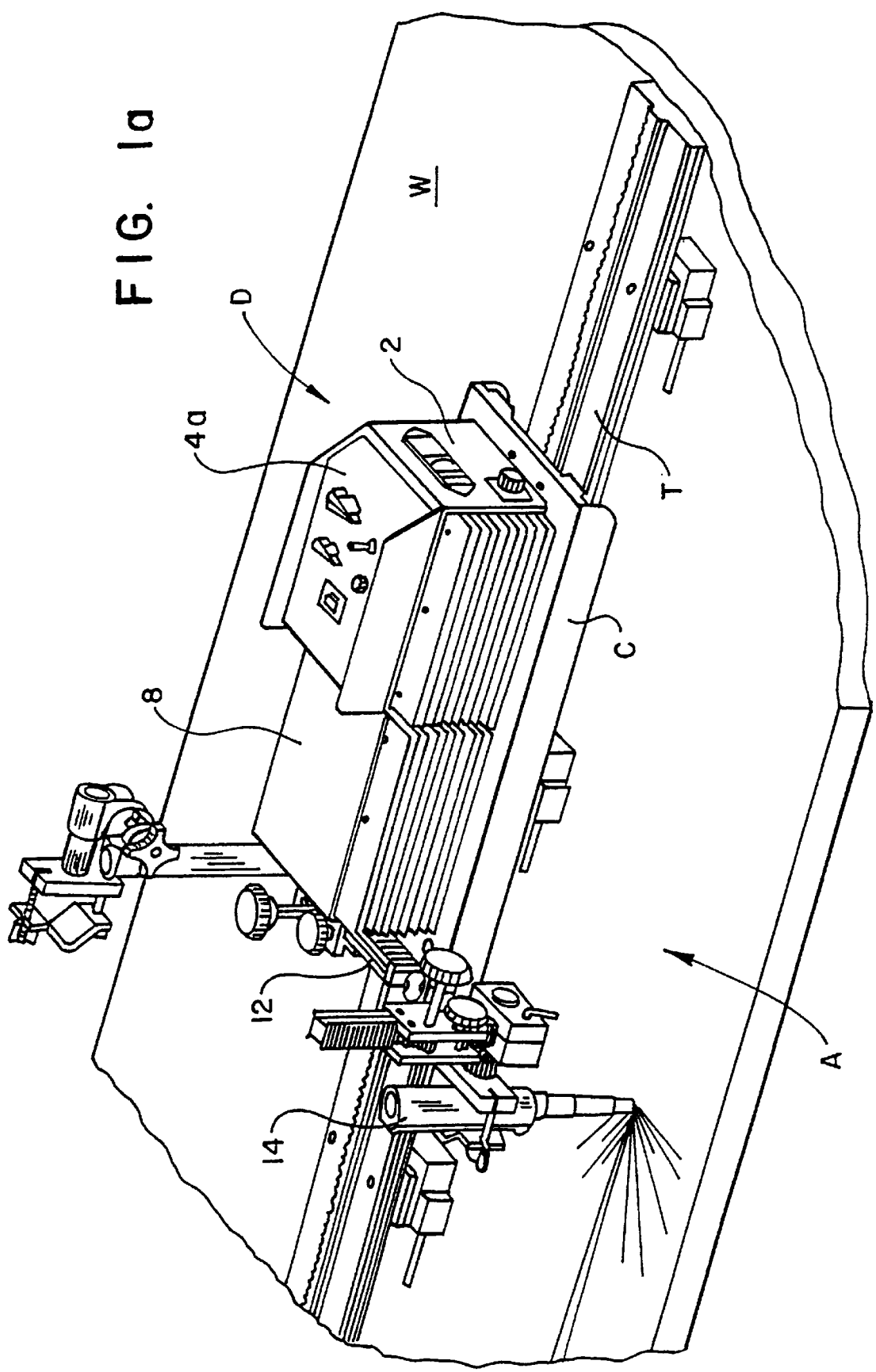

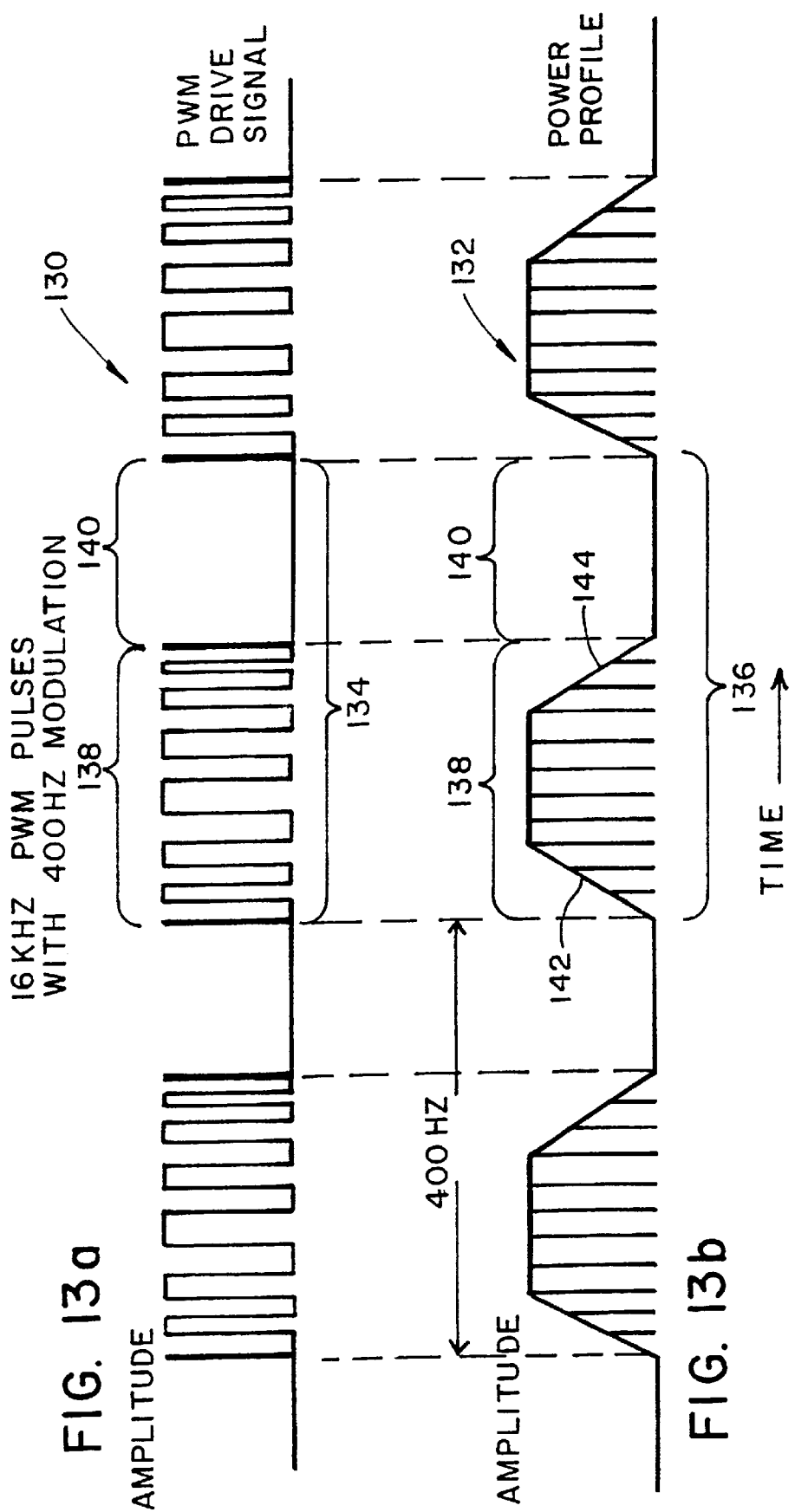

6,011,372

UNIFIED MODULAR SYSTEM OF DRIVES AND CONTROLS FOR MOBILE ROBOTIC APPLICATIONS

This application is a 371 of PCT/US/97/06986 Apr. 22, 1997. This application claims benefit of Provisional application No. 60/016,046 Apr. 22, 1996.

BACKGROUND OF THE INVENTION

1. Field of the Invention

This invention relates to automated cutting/welding systems in the metal working industry and more specifically to mobile welding/cutting systems.

2. Description of the Prior Art

Motorized and track guided cutting/welding systems are utilized to cut or weld metal in the metal working industry, utilizing a welding gun or other tool guided along a weld joint or specific path. These systems can control the motion of the welding gun or other tool in a variety of different manners, such as straight line travel at a selectable controlled speed, sequencing stops/starts, different speeds for various times and distances, weaving across a main path with a second axis or a complex multi-axis coordinated with sensor feedback, that can completely automate the cutting/welding process and correct for part deviations during operation.

Typically, these systems are dedicated to one particular function or perhaps to a few related functions. For example, the simplest operation is continuous straight line motion at a constant speed, which is often used for seam-welding or cutting. The system for this operation only requires a speed control knob and a direction switch. A skip-welding machine is also a straight line machine, but incorporates additional controls for start, stop and changing speeds at settable distances along the path. Another common function is weld weaving, where a second axis is added to the machine, with additional controls built into the system for controlling the operation of the second axis. A different two axis machine is an overlay machine, where one axis drives back and forth and the second axis steps at each end so as to completely cover a surface area. These prior art systems have the controls, the control logic and the drives enclosed in a common enclosure. Hence, when changing between operations, one system is replaced with another system.

Often a user of such systems requires remote control of such systems. These systems typically have a remote pendant permanently fixed thereto. Alternatively, a remote pendant is connected in parallel with the controls in the enclosure.

It is therefore an object of the present invention to provide a modular cutting/welding system wherein different modules can be combined to enable the desired cutting/welding operation(s) to be performed. It is an object of the present invention to provide a modular drive system with plug-in components and control panels, common drive modules and a uniform interface between the control panels and the drive modules. Still further objects of the present invention will become apparent to those of ordinary skill in the art upon reading and understanding the following detailed description.

SUMMARY OF THE INVENTION

Accordingly, we have invented a drive apparatus for a cutting/welding system. The drive apparatus comprises a first drive module including a first motor, a power supply, a first interface circuit connected between the power supply and the first motor, a first connector and a control module which provides control signals to the first controller via the first connector. The first interface circuit supplies power from the power supply to the first motor as a function of the provided control signals and the first connector enables the control module to be removably attached to the first drive module.

A second drive module is provided including a second motor and a second interface circuit connected to the second motor. A second connector connects the second drive module to the first drive module and connects the power supply to the second interface circuit. The control module provides control signals to the second interface circuit via the first connector. The second interface circuit supplies power from the power supply to the second motor as a function of the control signals provided to the second interface circuit.

A third drive module is provided including a third motor and a third interface circuit connected to the third motor. A second connector connects the third drive module to one of the first drive module and the second drive module and connects the power supply to the third interface circuit. The control module provides control signals to the third interface circuit. The third interface circuit provides power from the power supply to the third motor as a function of the control signals provided to the third interface circuit.

An accessory module is connectable to the first drive module via the second connector. The accessory module includes a control element that is connected to the control module via the second connector and the operation of the first interface circuit is controlled as a function of the operation of the control element. An extension cable is connectable between the control module and the first drive module to enable the provisioning of control signals from the control module positioned remotely from the first drive module. At least one of the first interface circuit, the second interface circuit and the third interface circuit provides power to the respective first motor, second motor and third motor during a power delivery segment of the supply of power therefrom. The power delivered to the motor is increased gradually at the beginning of the power delivery segment and is decreased gradually at the end of the power delivery segment.

In another embodiment, a cutting/welding system includes a first drive module having a first connector and a first motor which propels the first drive module in a first direction, a power supply, a control module removably attached to the first drive module via the first connector and a first interface circuit connected between the power supply and the first motor. The control module supplies one or more control signals to the first drive module via the first connector. The first interface circuit controls delivery of electrical power from the power supply to the first motor as a function of the supplied one or more control signals.

A second drive module has a second interface circuit connected to a second motor. The second drive module is removably attached to the first drive module via a second connector. The second interface circuit is connected to the power supply and the control module via the second connector. The second interface circuit controls the delivery of electrical power from the power supply to the second motor as a function of the control signals supplied to the first drive module. A work tool is attachable to the second drive module in a manner wherein the second motor causes the work tool to move transverse to the first direction in response to the second interface circuit controlling delivery of electrical power from the power supply to the second motor as a function of the control signals supplied by the first control module.

In another embodiment, a mobile robotic system includes a first drive module having a first motor and a first connector, a power supply and a control module removably attached to the first drive module via the first connector. The control module causes power to be switchably supplied from the power supply to the first motor which responds thereto by propelling the first drive module in at least one direction. A second drive module is provided having a second motor attachable to a work tool for controllably moving the work tool transverse to the at least one direction. The second drive module is connected to the first drive module via a second connector. The control module causes power to be switchably supplied from the power supply to the second motor which responds thereto by moving the work tool. An RF or optical receiver is provided for receiving signals from a remote source. The received signals cause the control module to switchably supply power to the first motor as a function of the received signals.

In another embodiment, a drive module of a mobile robotic system includes a controller, a first motor, a power supply, a first interface circuit which receives control signals from the controller and which supplies power from the power supply to the first motor as a function of the control signals and a connector for electrically connecting the controller and/or the first interface circuit to a second/auxiliary drive module. The second/auxiliary drive module has a second motor and a second interface circuit which receives control signals from the controller and/or the first interface circuit and which supplies power from the power supply to the second motor as a function of the supplied control signals. The accessory module has one or more control elements controllable by the controller. A selection means enables the operation of the controller to be adapted as a function of the setting of the selection means.

The selection means may by disposed on the second/auxiliary drive module and/or the accessory module and may be detectable by the controller. The operation of the controller is adapted as a function of the detected selection means. The selection means may be a personality module and/or switch or contacts.

BRIEF DESCRIPTION OF THE DRAWINGS

FIG. 1a is a perspective view of a mobile robotic cutting/welding system disposed on a track affixed to a workpiece;

FIG. 13a is an illustration of pulse width modulated signals provided by an interface circuit of a drive module to a motor thereof; and FIG. 13b is an illustration of a power profile provided to the motor by the pulse width modulated signals of FIG. 13a.

DETAILED DESCRIPTION OF THE PREFERRED EMBODIMENTS

With reference to FIG. 1a, a cutting/welding system A is utilized to cut or weld a workpiece W. Preferably, the cutting/welding system A includes a track T positionable on or adjacent the workpiece W and a drive apparatus D positionable on the track T.

Figure 1B:
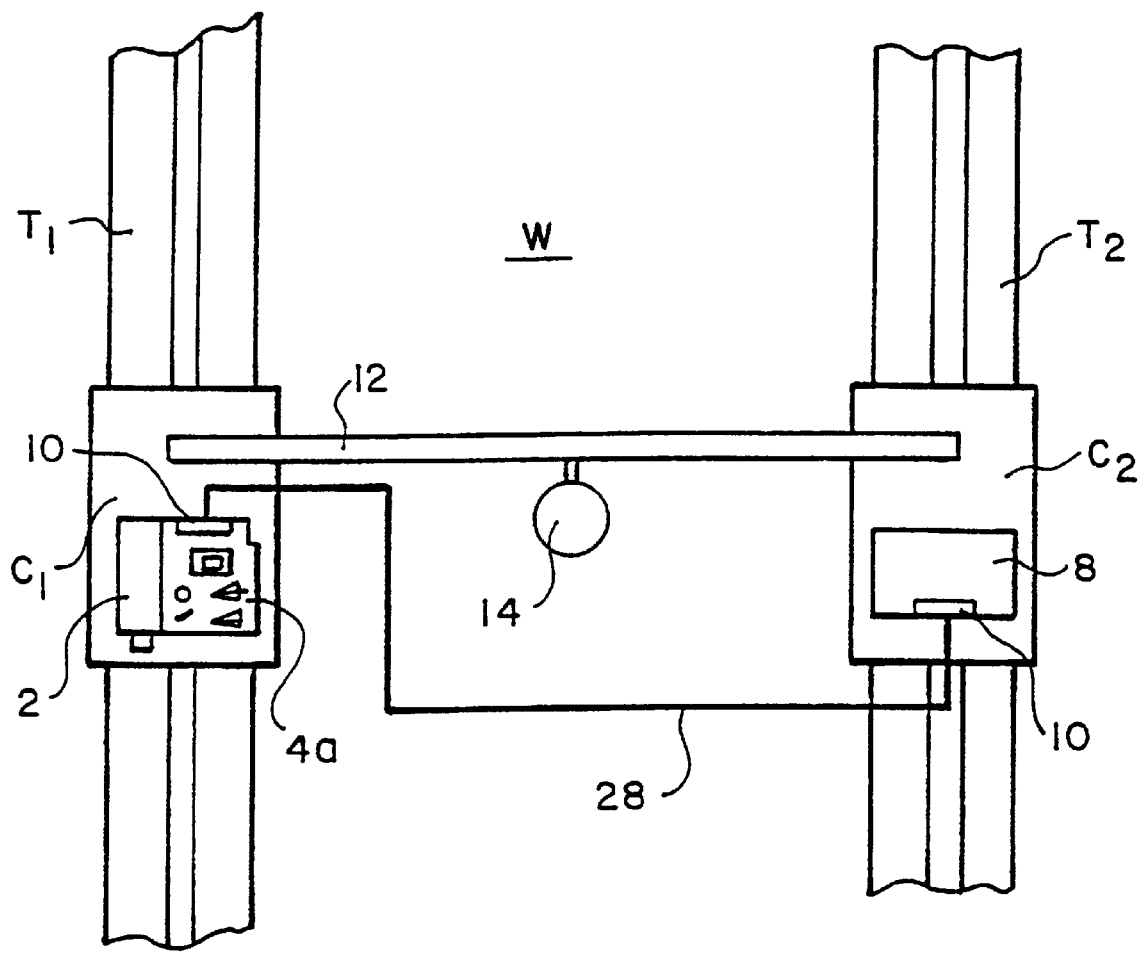
FIG 1b is a plan view of the mobile robotic cutting/welding system of FIG. 1 disposed on a pair of tracks affixed to a workpiece.
Figure 2:
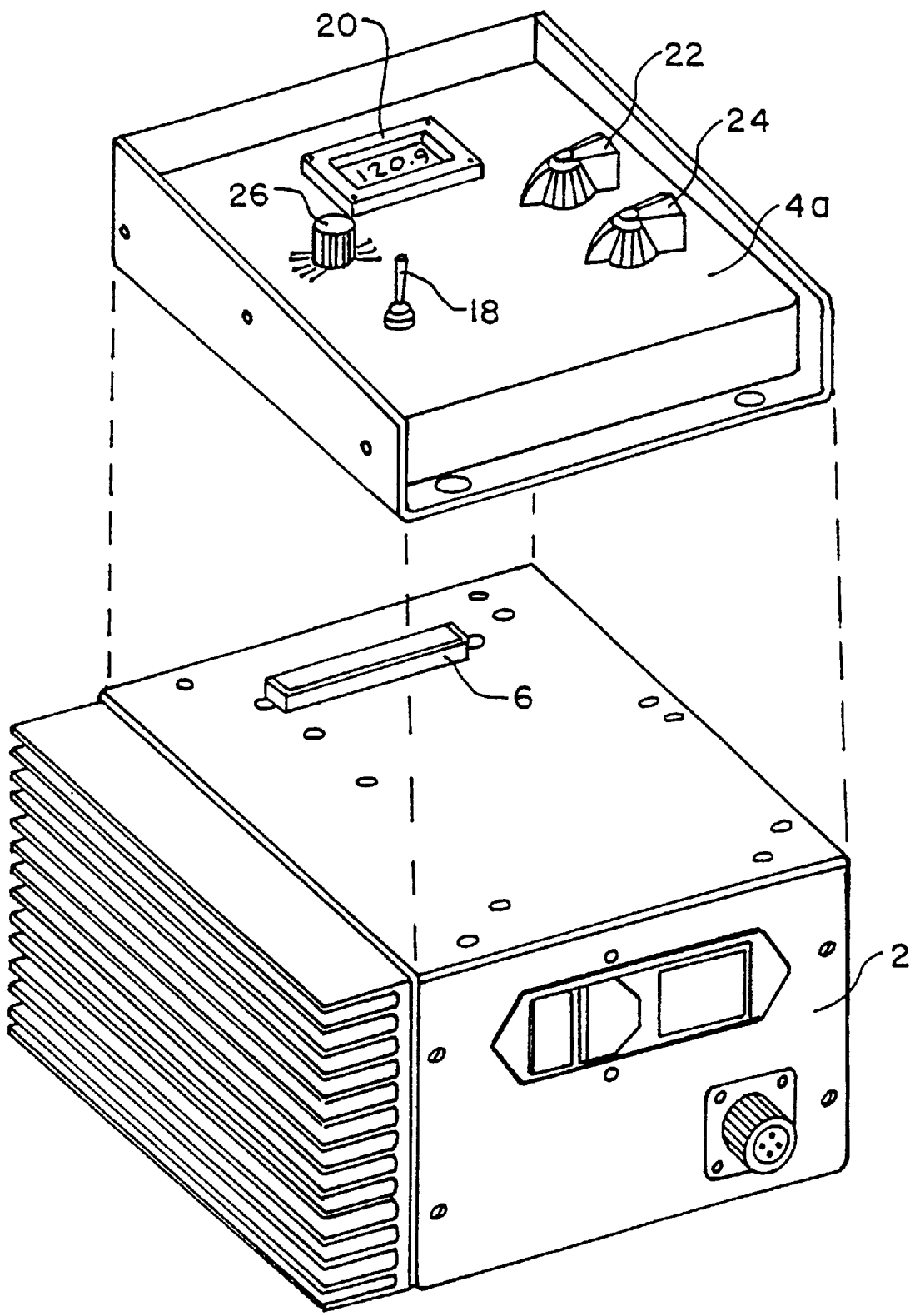
FIG. 2 is a perspective view of a straight control module in relation to a first drive module of the cutting/welding system of FIG. 1.
Figure 3:
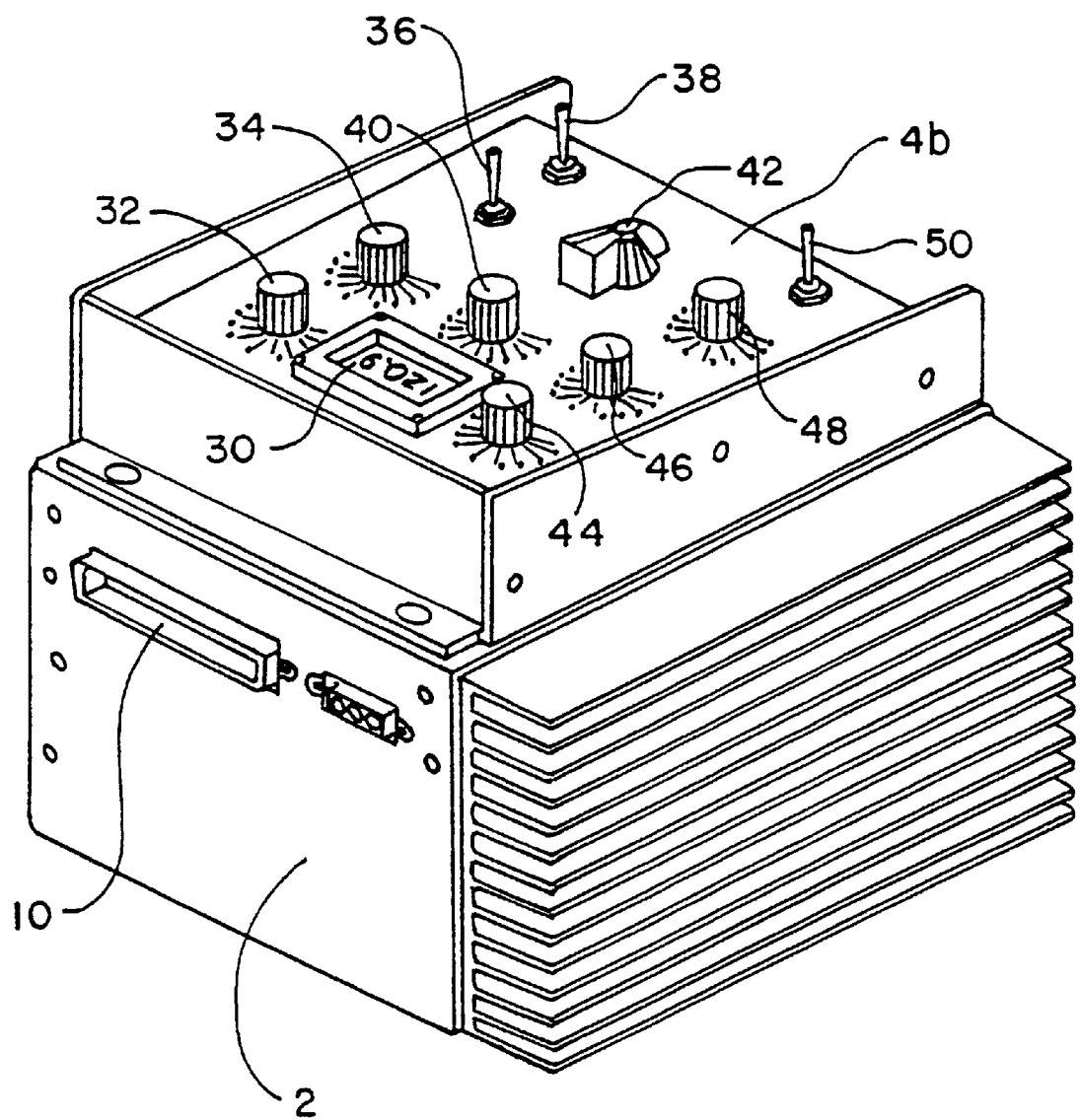
FIG. 3 is a perspective view of a weaver control module connected to a first drive module of the cutting/welding system of FIG. 1.
Figure 4:
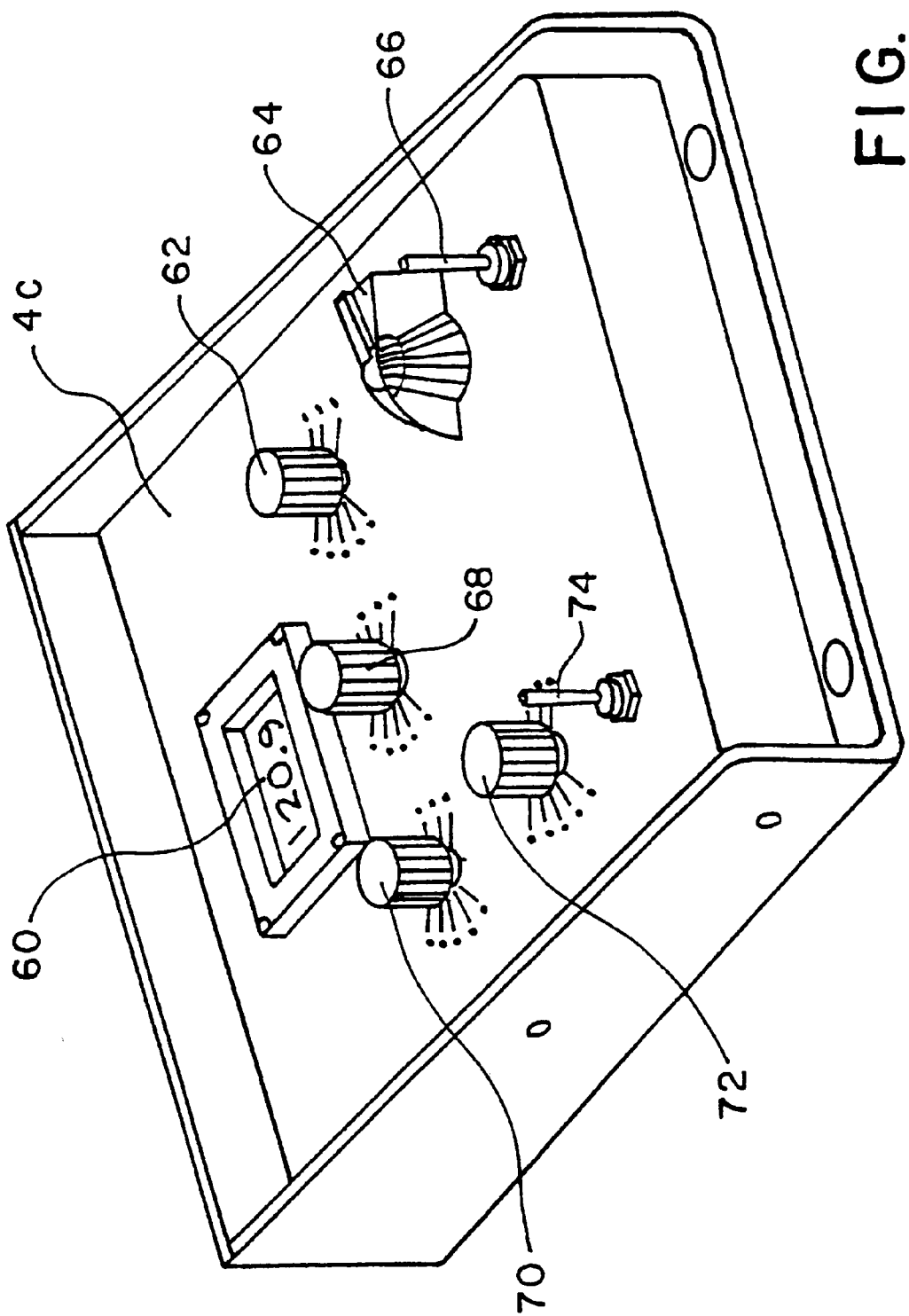
FIG. 4 is a perspective view of a stitch control module that is connectable to a first drive module of the cutting/welding system of FIG. 1.

With reference to FIGS. 2–4 and with continuing reference to FIG. 1a, the drive apparatus D includes a first drive module 2 connected to a carriage C. In one embodiment, a straight control module 4a is removably attached to the first drive module 2 via a first connector 6 having mating parts positioned on the first drive module 2 and the control module 4a. An auxiliary drive module 8 is connected to the carriage C and the first drive module 2 via a second connector 10 which has mating parts positioned on the auxiliary drive module 8 and the first drive module 2. The first drive module 2 and the auxiliary drive module 8 (to be described in greater detail hereinafter) are utilized in parallel to provide increased drive power to carriage C when loaded in excess of the drive power providable by the first drive module 2 alone.

A work arm 12 is positioned on the side of the carriage C opposite the first drive module 2. A work tool 14 is attached to an end of the work arm 12 opposite the carriage C. In the present invention, the work tool 14 can be a torch, an arc welding tip, a laser and the like; however, other work tools for cutting or joining materials may also be utilized. The work tool 14 is positioned on the work arm 12 and relative to the workpiece W for cutting/welding the workpiece W. The first drive module 2 and the auxiliary drive module 8 cooperate to propel the carriage C along the track T. Alternatively, if the first drive module 2 has sufficient power to propel the carriage C, the work arm 12 and work tool 14 along the track T, the first drive module 2 can be utilized in the absence of the auxiliary drive module 8.

The first connector 6 enables replacement of the straight control module 4a with, for example, a weaver control module 4b or a stitch control module 4c. The control modules 4a, 4b, 4c in combination with different drive modules, e.g., the first drive module 2, the auxiliary drive module 8, a second drive module 16 (FIG. 6) and/or other drive or accessory modules, to be described in greater detail hereinafter, enable movement of the work tool 14 in different manners relative to the workpiece W. For example, the straight control module 4a is utilized to control movement of the work tool 14 parallel to the track T in the direction of travel of the first drive module. The weaver control module 4b is utilized to control movement of the carriage C and consequently the work tool 14 in two orthogonal directions parallel to a surface of the workpiece W. The stitch control module 4c is utilized to control movement of the work tool 14 parallel to the track T in the direction of travel of the first drive module 2 in a manner different than the straight control module 4a. In preferred embodiments of the invention, the straight control module 4a is utilized with the first drive module 2; the weaver control module 4b is utilized with the first drive module 2 and the second drive module 16; and the stitch control module 4c is utilized with the first drive module 2. The auxiliary drive module 8 can be connected to the first drive module 2, the second drive module 16 or other drive modules as necessary to provide additional drive power for a desired axis. As will be described in greater detail hereinafter, the control modules 4a, 4b or 4c adapt the operation of the first drive module 2 and, as required, the auxiliary drive module 8, the second drive module 16, and the like, to accomplish a desired cutting/welding of the workpiece W.

Each control module 4a, 4b or 4c has user controls that enable the movement of the work tool 14 to be controllable adapted for different cutting/welding patterns. For example, the straight control module 4a has a weld contact switch 18, a digital readout 20, a carriage travel switch 22, a cycle select switch 24 and a speed control potentiometer 26.

With reference to FIG. 1b and with continuing reference to FIGS. 1a and 2–5, in another embodiment, the straight control module 4a is connected to the first drive module 2 which is connected to a first carriage $C_1$. The auxiliary drive module 8 is connected to a second carriage $C_2$. The first carriage $C_1$ and the second carriage $C_2$ are positioned on tracks $T_1$ and $T_2$, respectively. The work arm 12 is connected between the first carriage $C_1$ and the second carriage $C_2$ and the work tool 14 is connected to the work arm 12. A multi-conductor cable 28 is connected between the mating part of the second connector 10 on the first drive module 2 and the second connector 10 on the auxiliary drive module 8.

The first drive module 2 and the auxiliary drive module 8 are utilized in parallel to propel the work tool 14 relative to workpiece W. More specifically, the straight control module 4a provides control signals to the first drive module 2. Preferably, the first drive module 2 has an interface circuit (described hereinafter) that generates synchronization signals which are provided to the auxiliary drive module 8 via cable 28. The control signals and the synchronization signals enable the first drive module 2 and the auxiliary drive module 8 to move in synchronization thereby enabling the work tool 14 to be moved in a desired manner. Alternatively, the control signals are provided in parallel to the first drive module 2 and the auxiliary drive module 8 thereby avoiding the need to generate synchronization signals.

Figure 5:
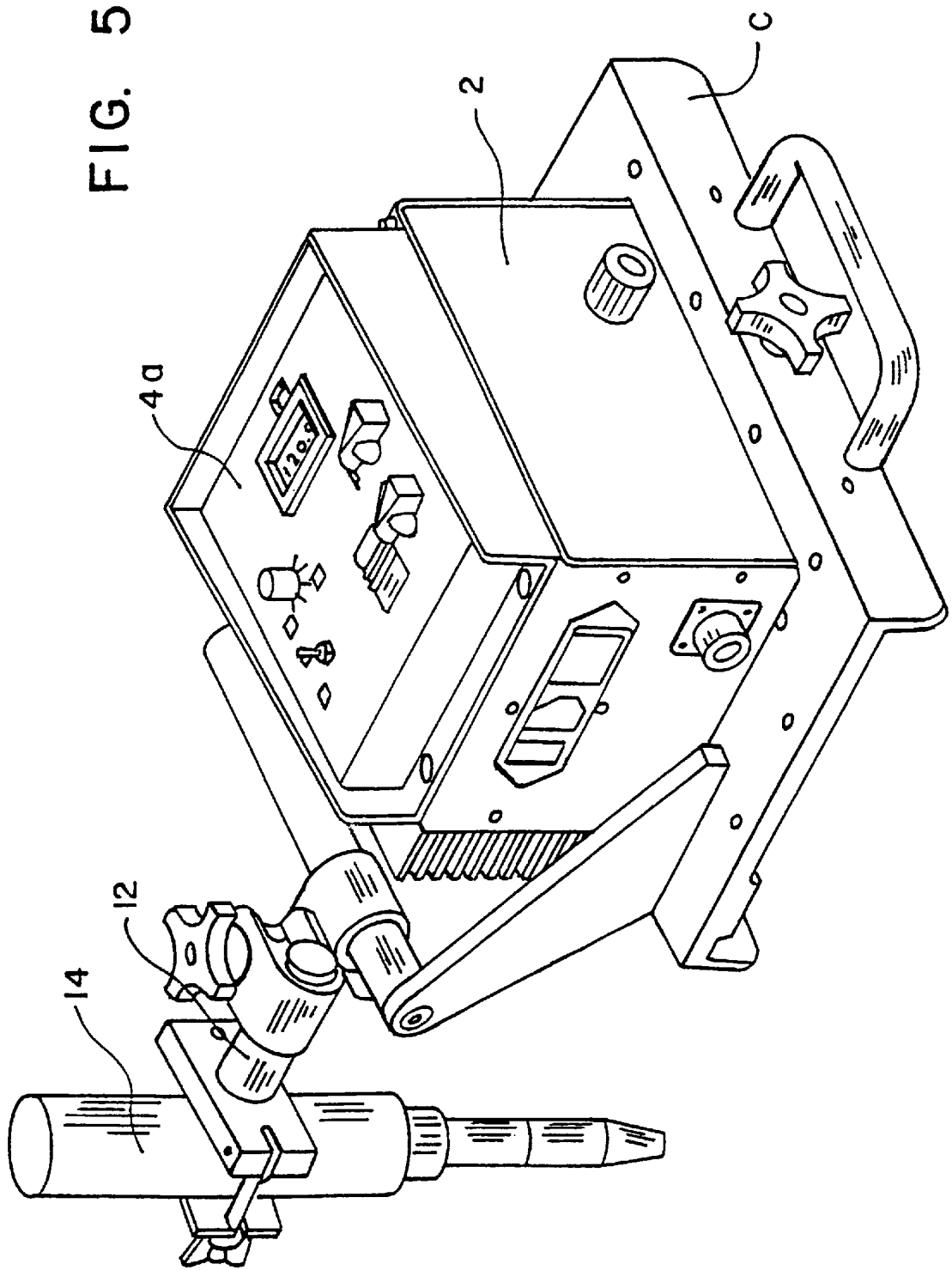
FIG. 5 is a perspective view of a carriage having an attached work arm and a work tool and including the straight control module and first drive module of FIG. 2 attached thereto.

With reference to FIG. 5, and with continuing reference to FIGS. 1a and 2, the first drive module 2 propels itself, the carriage C and the work tool 14, affixed to the carriage C via work arm 12, in a first direction along the track T in response to control signals from the straight control module 4a. The straight control module 4a also controls one or more functions of the work tool 14. Specifically, the weld contact switch 18 enables the opening and closing of a weld contactor (not shown) that is utilized to provide electrical power to the work tool 14, e.g., an arc welding tip. The digital readout 20 provides a visual indication of the speed of the first drive module 2 on the track T. The carriage travel switch 22 is a multi-position switch that is utilized to select forward, stop or reverse direction control of the first drive module 2. The cycle select switch 24 is a multi-position switch that is utilized to control the manner in which the first drive module 2 traverses the track T. For example, one position of the cycle select switch 24 causes the first drive module 2 to cyclically traverse between a first limit and a second limit on the track T at a rate or speed selected by the speed control potentiometer 26. Another position of the cycle select switch 24 causes the first drive module 2 to traverse the track T in the forward or reverse direction on the track absent a limit. Still another position of the cycle select switch 24 causes the first drive module 2 to traverse from a start position to the second limit on the track T. When the first drive module 2 reaches the second limit, the first drive module 2 stops and the weld contactor turns off.

Figure 6:
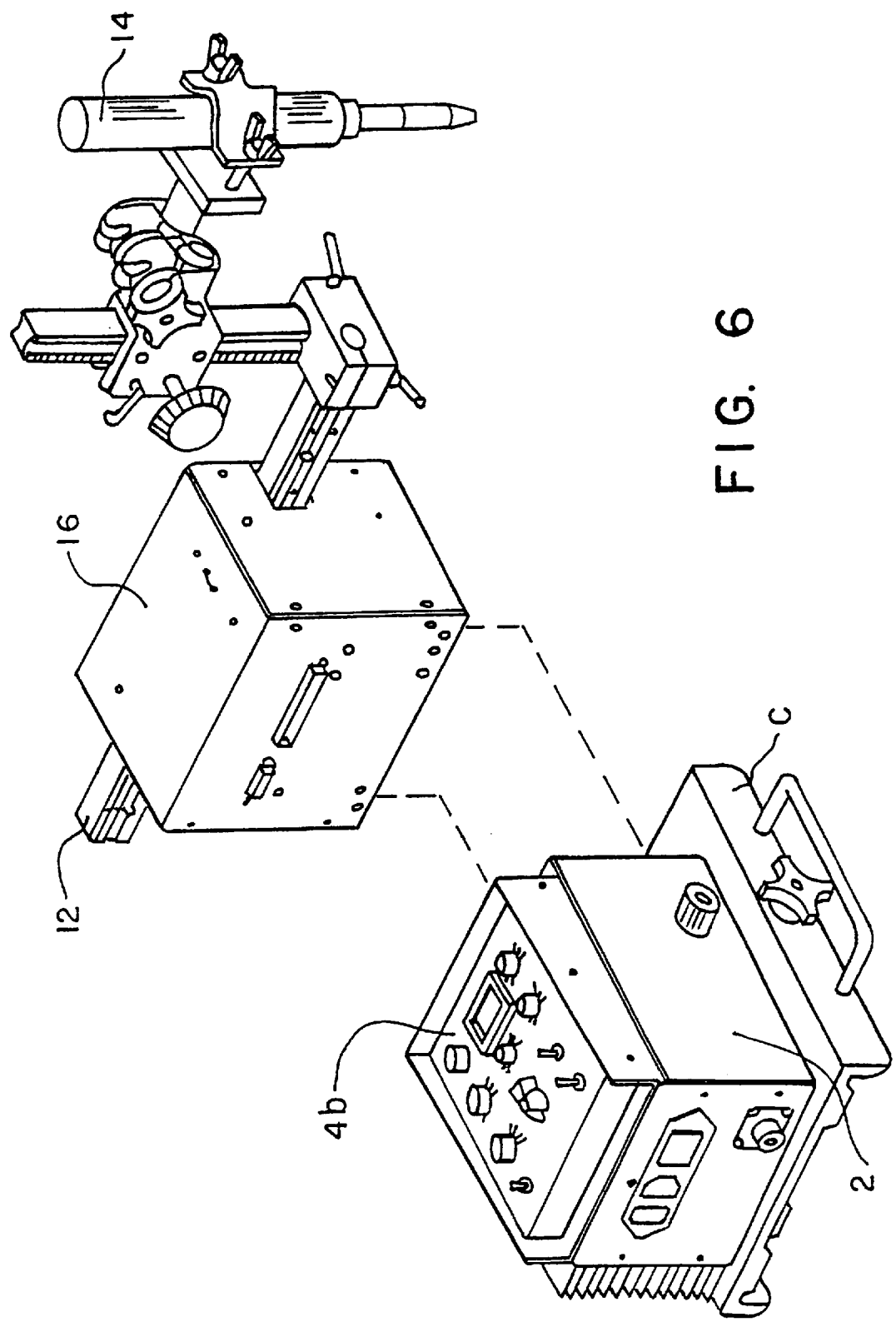
FIG. 6 is a perspective view of a weaver system including a second drive module having a work arm including work tool attached thereto, the second drive module positioned in relation to the first drive module and the weaver control module of FIG. 3 which are attached to a carriage.

With reference to FIG. 6, and with continuing reference to FIGS. 1a and 3, the weaver control module 4b is utilized with the first drive module 2 and the second drive module 16. The weaver control module 4b has a digital readout 30, an amplitude potentiometer 32, a dwell right potentiometer 34, a carriage travel switch 36, a weld contact switch 38, a steering control potentiometer 40, a mode select switch 42, a weave speed potentiometer 44, a dwell left potentiometer 46, a speed control potentiometer 48 and a start/stop switch 50. The amplitude potentiometer 32 adjusts the extent of a weaving stroke. In a preferred embodiment, the weaving stroke can be adjusted up to a two inch maximum stroke. The steering control potentiometer 40 enables the center position of the work tool 14 to be adjusted plus or minus two inches. The start/stop switch 50 enables/disables all functions of the first drive module 2 and the second drive module 16. The digital readout 30, the carriage travel switch 36, the speed control potentiometer 48 and the weld contact switch 38 cause the first drive module 2 to operate in a manner similar to that described in connection with the digital readout 20, carriage travel switch 22, the speed control potentiometer 26 and the weld contact switch 18, respectively, of the straight control module 4a.

Figure 7A:
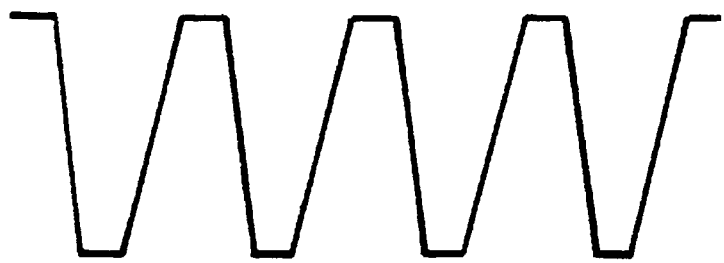
FIGS. 7a–7d are illustrations of cutting/welding patterns producible by the weaver system of FIG. 6.
Figure 7B:
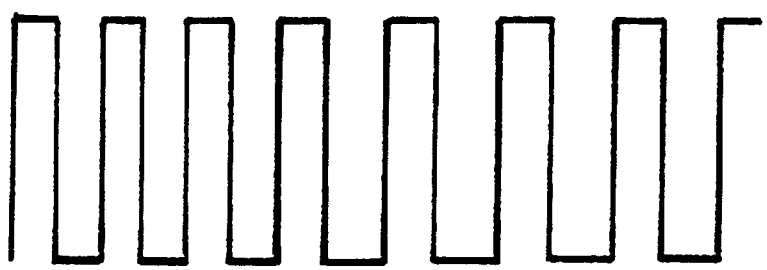
Figure 7C:
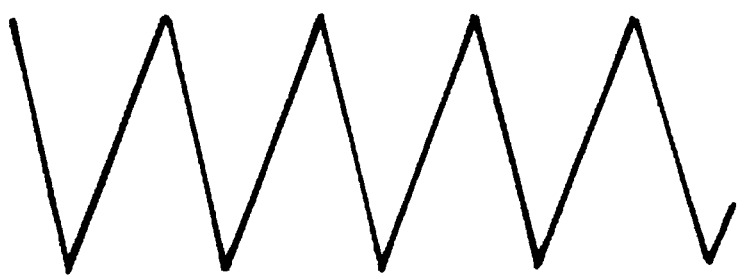
Figure 7D:

The mode select switch 42 of the weaver control module 4b enables selection of various predetermined welding modes. For example, as shown in FIG. 7a, placing the mode selector switch 42 in a first or run position causes the first drive module 2 to traverse the track T at a velocity determined by the setting of the speed control potentiometer 48. The second drive module 16 moves or weaves the work tool 14 transverse to the longitudinal axis of the track via the work arm 12. The right dwell and left dwell potentiometers 34, 46 control the duration the weaving stroke pauses at each end of the weaving stroke and the weave speed potentiometer 44 controls the rate of the weaving stroke. As shown in FIG. 7b, placing the mode select switch 42 in a second or step position causes the first drive module 2 to travel during a dwell of the work tool 14 and to stop when the second drive module 16 is weaving the work tool 14 between a right dwell position and a left dwell position. As shown in FIG. 7c, placing the mode select switch 42 in a third or stop on dwell position causes the first drive module 2 to travel during the weaving stroke and to stop during a dwell. Lastly, as shown in FIG. 7d, placing the mode select switch 42 in a fourth or no weave position causes the first drive module 2 to operate in a manner similar to the straight control module 4a.

With reference back to FIGS. 1a and 4, the stitch control module 4c is utilized with the first drive module 2. The stitch control module 4c has a digital readout 60, a crater fill time potentiometer 62, a carriage travel switch 64, a weld contact switch 66, a weld time potentiometer 68, a skip time potentiometer 70, a speed control potentiometer 72 and a stitch/continuous switch 74. The crater fill time potentiometer 62 enables selection of the duration when the work tool 14 is stopped in a position to perform a crater fill. Preferably, the crater fill interval is adjustable between 0 and 1.5 seconds. The skip time potentiometer 70 enables selection of the interval between welds, preferably, between 0.3 and 15 seconds which corresponds to a skip weld length between 0.6 and 30 inches. Between welds, the first drive module 2 moves at a maximum speed. The weld time potentiometer 68 enables selection of a weld interval, preferably, between 1 and 50 seconds which corresponds to a weld length between 2 and 100 inches depending on the speed of the first drive module selected by the speed control potentiometer 72. Hence, in the preferred embodiment, the stitch control module 4c and the first drive module 2 cooperate to cause the work tool 14 to alternately weld between 2 and 100 inches and skip welding between 0.6 and 30 inches. The stitch/continuous switch 74 selects between stitch welding and continuous welding. The digital readout 60, the carriage travel switch 64, the weld contact switch 66 and speed control potentiometer 72 operate in a manner similar to that described in connection with the digital readout 20, the carriage travel switch 22, the weld contact switch 18 and the speed control potentiometer 26, respectively, of the straight control module 4a.

Figure 8A:
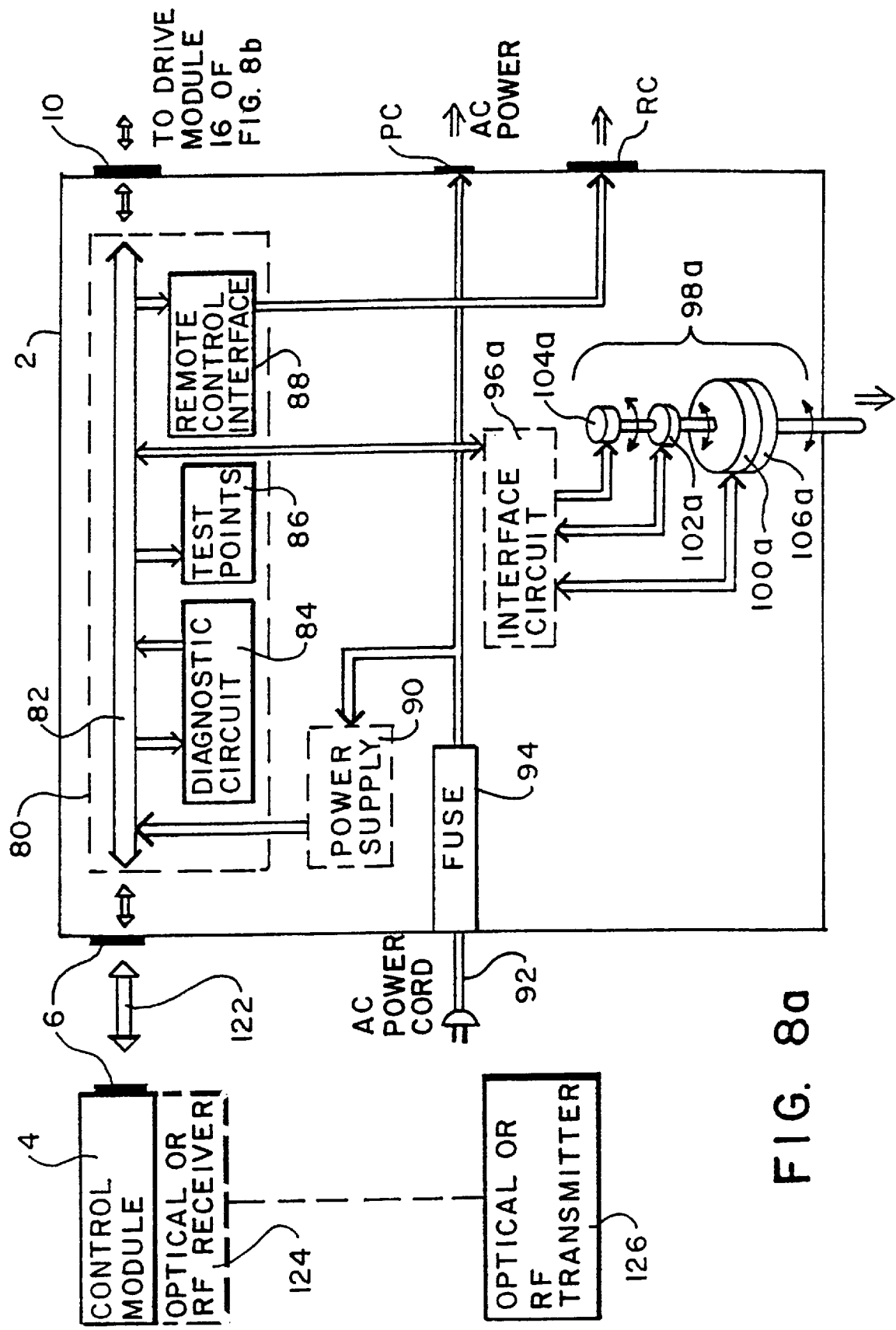
FIGS. 8a–8b are diagrammatic illustrations of connections between internal components of a first drive module, a second drive module, a third drive module and an accessory module.

With reference to FIG. 8a, a control module 4, e.g., 4a, 4b or 4c, is connected to the first drive module 2 via the first connector 6. The first drive module 2 includes an interconnect card 80 connected between the first connector 6 and the second connector 10. The interconnect card 80 includes a bus 82 extending between the first connector 6 and the second connector 10. The bus 82 is a power and control bus that enables the transmission of DC power and control signals. Positioned on interconnect card 80 and connected to bus 82 are diagnostic circuit 84, test points 86 and a remote control interface 88. The first drive module 2 includes a wide voltage range universal power supply 90 for converting incoming AC power into DC power useable by electronic circuits and elements in, for example, the control module 4, the diagnostic circuit 84, the test points 86 and the remote control interface 88. The power supply 90 is connected to the electronic circuits and elements via the bus 82. Incoming AC power is provided to the power supply 90, which preferably operates between 42–240 VAC at 50–400 Hz, via an AC power cord 92 and a fuse 94. In the preferred embodiment, AC power is also provided to a power connector PC positioned on the first drive module 2. The remote control interface 88 is connected to a remote connector RC positioned on the first drive module 2. In one embodiment, the remote control interface 88 is a relay that switchably controls the delivery of power from an external power supply to customer equipment (not shown).

The diagnostic circuit 84 and the test points 86 enable testing of various functions of the control module 4, the remote control interface 88 and other circuitry of the first drive module 2 and the second drive module 16. A first interface circuit 96a is connected between the bus 82 and a first drive 98a of the first drive module 2. The first drive 98a includes a first motor 100a, a first position sensor 102a and a first brake 104a. The first motor 100a includes a first gear arrangement 106a that enables the first motor 100a to coact with the track T.

In operation, a speed control signal is provided by the control module 4, e.g., the straight control module 4a, to the first interface circuit 96a based on the position of the speed control potentiometer 26. Preferably, the speed control signal is an analog signal; however, a digital signal can also be utilized. In response to receiving the speed control signal, the first interface circuit 96a switchably supplies power from the power supply 90 to the first motor 100a. The rate that the first interface circuit 96a switches power from the power supply 90 to the first motor 100a is related to the level of the speed control signal. The control module 4 causes the first interface circuit 96a to switchably supply power to the motor 100a in a manner that causes the motor 100a to rotate clockwise or counterclockwise based on the position of the carriage travel switch 22; operates the first motor 100a cyclically or linearly based on the position of the cycle select switch 24; and/or stops the first motor 100a when the carriage C reaches a desired limit of travel on the track T. The first interface circuit 96a also processes position commands received from the control module 4 and supplies position data and speed data to the control module 4; synchronization signals to the auxiliary drive module 8, when it is connected to the first drive module 2; and signals to the diagnostic circuit 84 regarding its status. The first interface circuit 96a also controllably supplies power to the first brake 104a and the first position sensor 102a and receives a speed sense signal from the first motor 100a and a position signal from the first position sensor 102a. The received speed sense signal and position signal are utilized by the first interface circuit 96a in a feedback mode to control the speed of the first motor 100a and position of the first drive module 2 on the track T. The first gear arrangement 106a enables the first motor 100a to coact with different types of mechanical packages, e.g., track T or wheels of a trackless carriage.

Figure 8B:
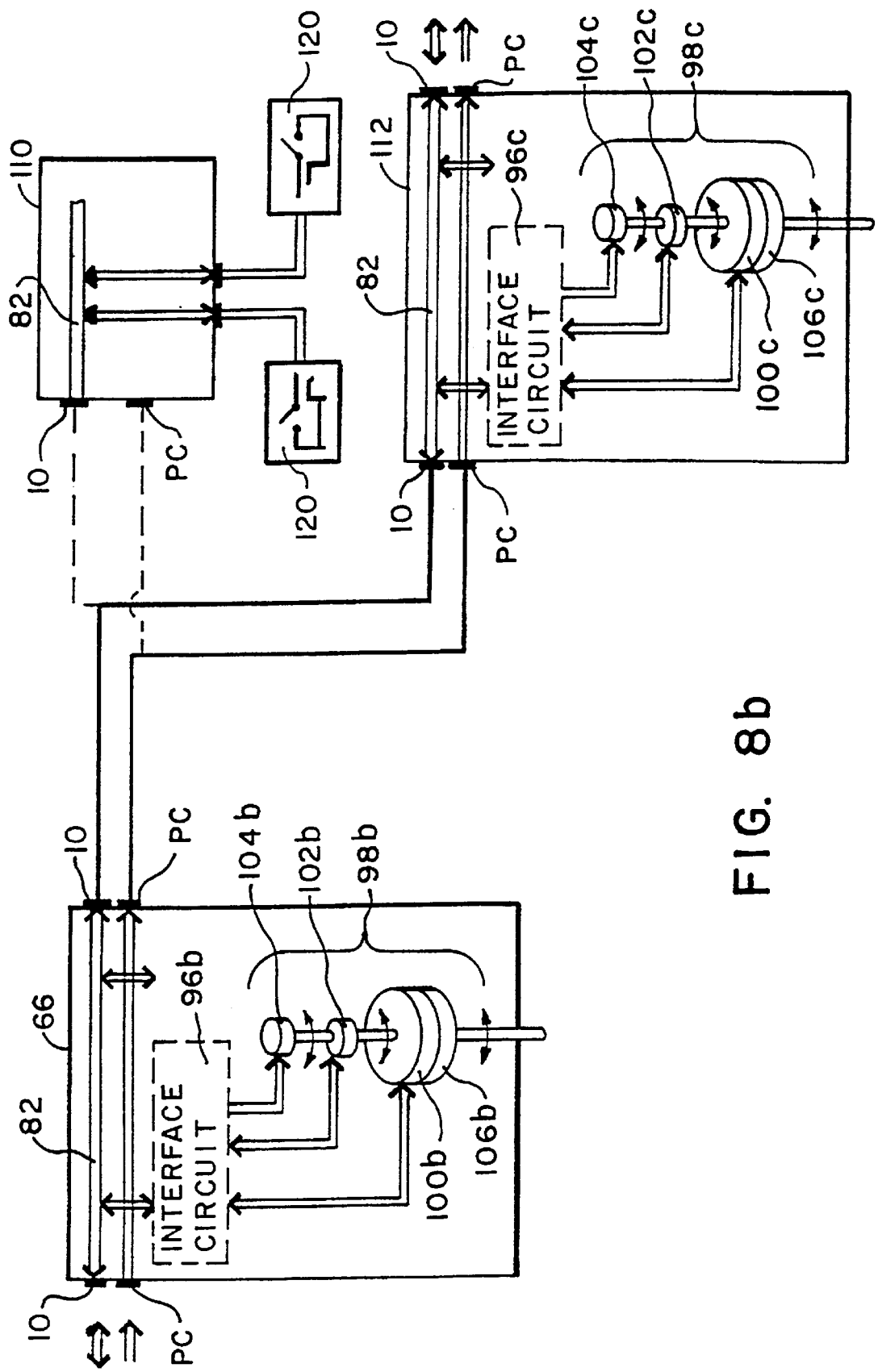

With reference to FIG. 8b, the second drive module 16 includes a pair of second connectors 10 and a pair of power connectors PC. One of the second connectors is utilized to chain all or part of the bus 82 to the second drive module 16 and one of the power connectors PC is utilized to convey AC power to the second drive module 16. The other of the second connectors 10 and the power connectors PC of the second drive module 16 is utilized to chain to the bus 82 an accessory module 110 and/or a third drive module 112, each of which has one or more second connectors 10 and/or another power connector PC. In this manner, combinations of an accessory module 110 and/or a third drive module 112 can be chained to the second drive module 16 to enable a desired welding or cutting operation. Alternatively, the accessory modules 110 and/or third drive modules 112 can be connected directly to the first drive module 2 in the absence of the second drive module 16.

The second drive module 16 includes a second interface circuit 96b connected between the bus 82 and a second drive 98b of the second drive module 16. The second drive 98b includes a second motor 100b, a second position sensor 102b and a second brake 104b. A second gear arrangement 106b enables the second motor 100b to coact with, for example, the work arm 12. The second interface circuit 96b receives via bus 82 control signals, such as speed commands and position commands, from the control module 4, e.g., the weaver control module 4b, and DC power from the power supply 90. The second interface circuit also supplies via the bus 82 signals regarding its status to the diagnostic circuit 84. The second interface circuit 96b switchably supplies power from the power supply 90 to the second motor 100b as a function of the position of control switches and/or potentiometers on the control module, e.g., the mode select switch 42 and/or weave speed potentiometer 44 of the weaver control module 4b. The second position sensor 102b and the second motor 100b provide the second interface circuit 96b with a position sense signal and a speed sense signal, respectively. The second interface circuit 96b utilizes the position sense signal and the speed sense signal in a feedback mode to control the speed and position of the second motor 100b. The second interface circuit 96b provides synchronization signals to the auxiliary drive module 8 when it is connected to the second drive module 16.

Figure 9A:
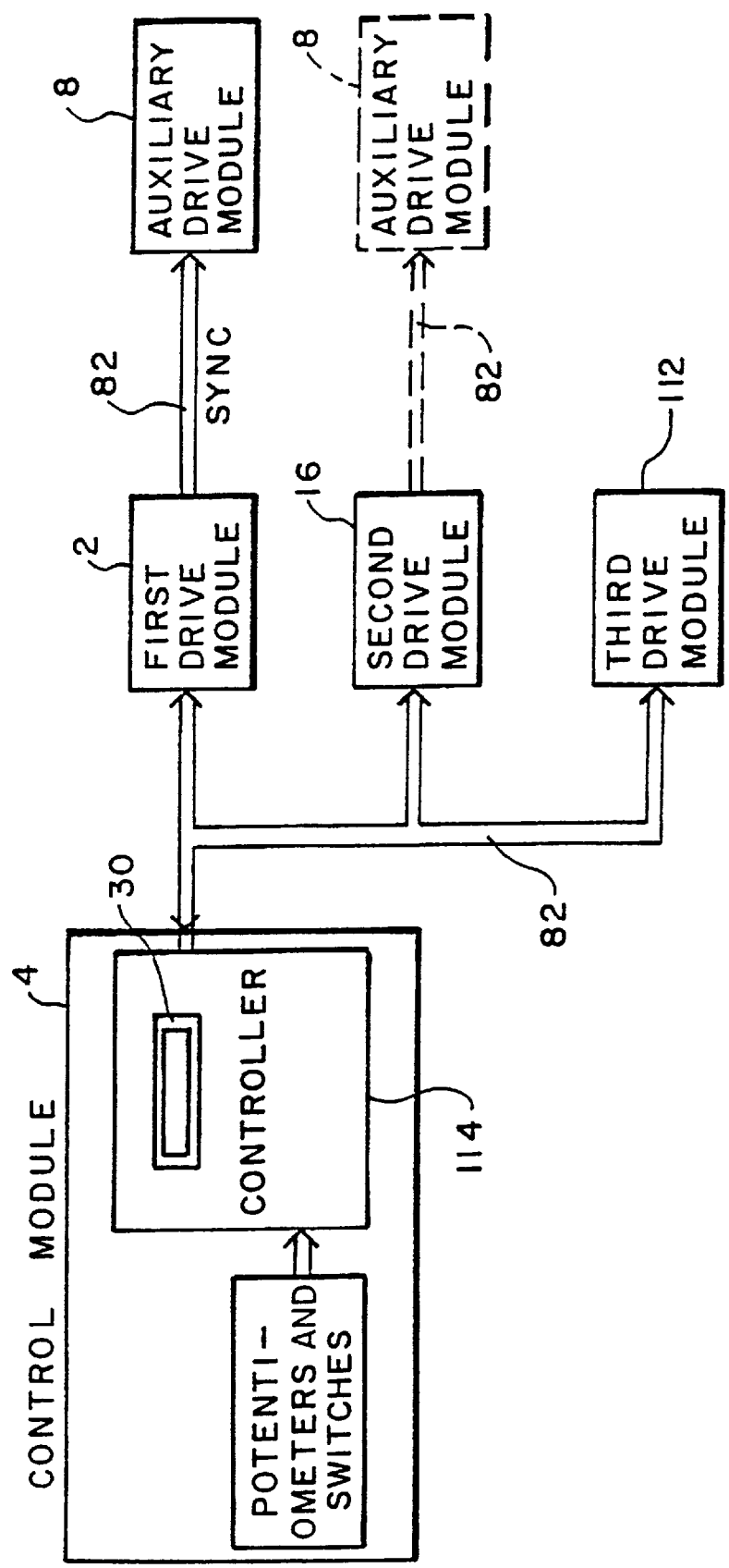
FIGS. 9a–9b are diagrammatic illustrations of the connection of the control module to a plurality of drive modules where one of the drive modules has an auxiliary drive module connected thereto.
Figure 9B:
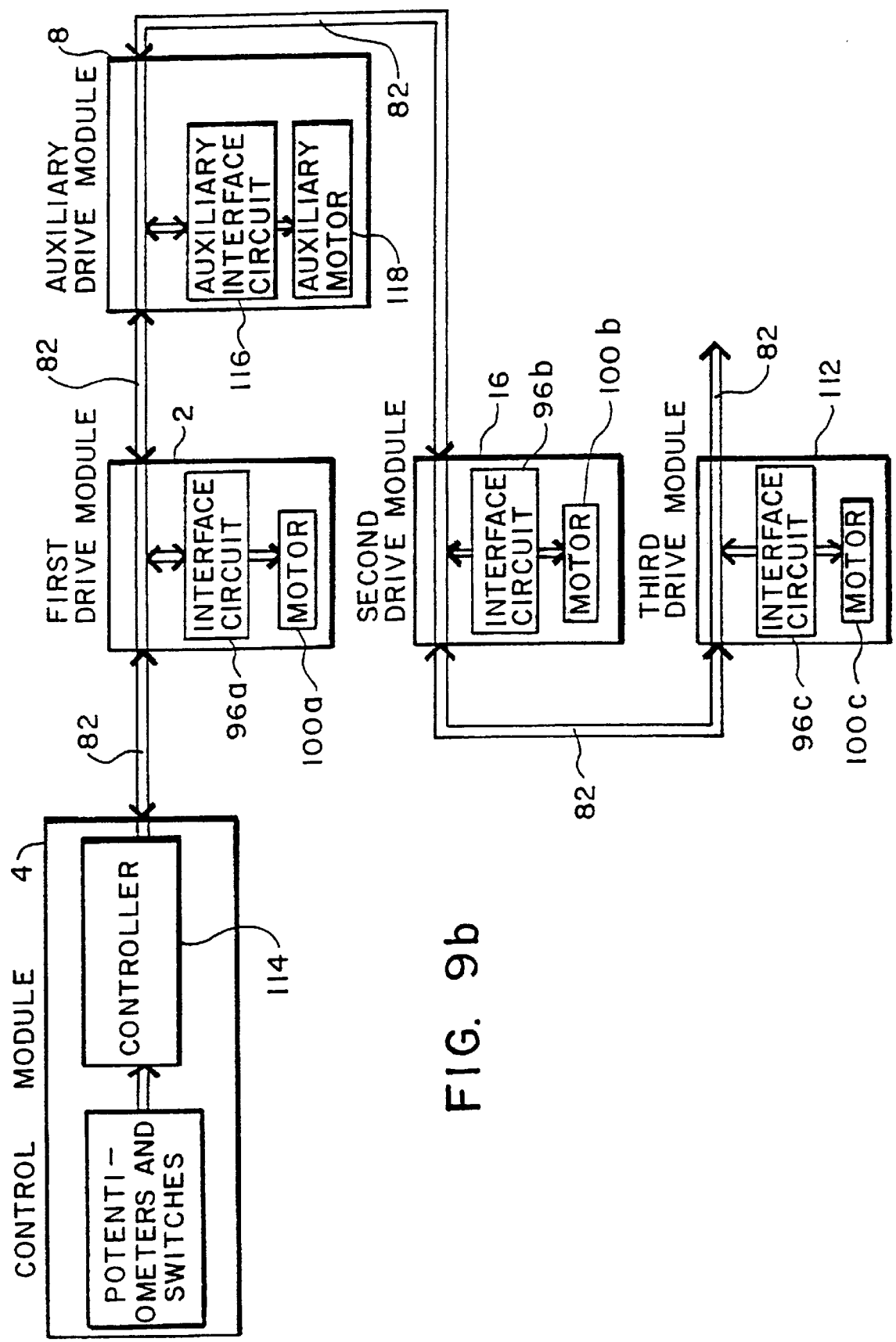

Preferably, the control modules 4a, 4b and 4c include a controller or control circuitry 114, shown best in FIGS. 9a–9b, that performs "high-order" or intelligent control processing such as, for example, internal clock keeping, waveform profiling and the like. In contrast, each interface circuit 96 conditions control signals from the control module 4 for use by the associated motor 100, position sensor 102 and/or the brake 104. This signal conditioning may include, for example, converting low power drive signals into high power drive signals for use by the motor 100. The control modules 4a, 4b, 4c and the interface circuits 96 have internal feedback control loops for controlling their respective functions. Moreover, control loops are provided, as required, between the control modules 4a, 4b, 4c and the interface circuits 96. Preferably, each interface circuit 96 also generates synchronization signals, based on control signals from the control module 4, for use by auxiliary drive module 8 connected thereto.

Each control module 4a, 4b and 4c is adapted to cause the first interface circuit 96a to supply high power level drive signals to the first motor 100a in one or more different manners. For example, the straight control module 4a supplies control signals to the first interface circuit 96a which causes the first motor 100a to propel the first drive module 2 cyclically between a first limit and a second limit; propel the first drive module 2 in the forward or reverse direction absent a limit; or propel the first drive module from a start position to a second limit and then reverse direction. The straight control module 4a includes the weld contact switch 18, the digital readout 20, the carriage travel switch 22, the cycle select switch 24 and the speed control potentiometer 26 that are utilized to adapt the operation of the control module 2 to perform a desired straight welding/cutting operation.

The stitch control module 4c supplies control signals to the first interface circuit 96a which operates the work tool 14 and causes the first motor 100a to propel the first drive module 2 such that the work tool 14 alternately welds a portion of the workpiece W and does not weld another portion of the workpiece W. Moreover, between welds, the stitch control module 4c causes the first motor 100a to propel the drive module 2, and consequently the work tool 14, at maximum speed. Furthermore, the stitch control module 4c can cause the first motor 100a to momentarily pause thereby enabling the work tool 14 to perform a crater fill. The stitch control module 4c includes potentiometers 62, 68, 70 and 72 to control crater fill time, weld time, skip time and speed, respectively, of the first drive module 2. Switches 64, 66 and 74 control carriage travel, weld contact and stitch/continuous selection, respectively, of the first drive module 2. When utilized with the stitch control module 4c, the operation of the first drive module 2 is adapted to perform a desired stitch welding/cutting operation.

The weaver control module 4b is utilized in combination with the first drive module 2 and the second drive module 16. Control signals from the weaver control module 4b to the first and second interface circuits 96a and 96b synchronize the operation of the first and second motors 100a and 100b of the first drive module 2 and second drive module 16, respectively, to selectively produce one or more of the weld patterns shown in FIGS. 7a–7d. The weaver control module 4b includes potentiometer 48 to control the speed of the first drive module 2 and switches 50, 42, 36 and 38 to control start/stop, mode select, carriage travel and weld contact, respectively, of the first drive module 2. The weaver control module 4b also includes potentiometers 40, 46, 34, 32 and 44 to control steering, dwell left, dwell right, amplitude and weave speed of the second drive module 16. Hence, when utilized with the weaver control module 4b, the operation of the first drive module 2 and the second drive module 16 is adapted to perform a desired weaving welding/cutting operation. Hence, the control modules 4a, 4b and 4c enable the operation of the drive modules, e.g., 2 and/or 16, to be adapted for a desired cutting/welding operation.

With ongoing reference to FIG. 8b, a third drive module 112 includes a third interface circuit 96c, a third motor 100c, a third position sensor 102c, a third brake 104c and a third gear arrangement 106c that cooperate with the power supply 90 and control module 4 in the manner described above in connection with the second drive module 16. The work arm 12 is connected to the third gear arrangement 106c of the third drive module 112. Control signals from the control module 4 and power from the power supply 90 are provided to the third drive module 112 via bus 82 extending between the second drive module 16 and the third drive module 112. The bus 82, extending between the second drive module 16 and the third drive module 112, may include flexible conductors to enable movement therebetween. The third drive module 112 enables the work tool 14 to be moved in yet another direction transverse to movement directions enabled by the first drive module 2 and the second drive module 16, e.g., normal to the surface of the workpiece W. For example, the third drive module 112 includes a gear (not shown) that coacts with the second gear arrangement 106b of the second drive module 16; hence, enabling the third drive module 112 to be moved relative to the second drive module 16, preferably orthogonal to the direction of movement of the work arm 12 by the first drive module 2 and the second drive module 16. For example, the third drive module 112 moves the work tool 14, attached thereto by the work arm 12, in a direction orthogonal to the track T and in a plane parallel to the surface of the workpiece W. The second drive module 16 moves the third drive module 112, and consequently the work tool 14, normal to the surface of the workpiece W, and the first drive module 2 moves the second and third drive modules 16, 112 along the track T parallel to the surface of the workpiece W.

An accessory module 110 may be connected to any of the first, second and third drive modules 2, 16 and 112 via a second connector 10 disposed thereon. In one embodiment, the accessory module 110 includes limit switches 120 that are connected to bus 82. The accessory module 110 may also include one or more other or alternate components that are controlled by the control module 4 and/or receive power from the power supply 90 or the power connector PC disposed on the accessory module 110.

With reference to FIG. 9a, the control module 4 includes potentiometers and switches, e.g., potentiometers 32, 34, 40, 44, 46 and 48 and switches 36, 38, 42 and 50 of the weaver control module 4b of FIG. 3, that enable control of one or more drive modules in a desired manner. The control module 4 also includes a controller 114 which includes discrete and/or integrated control circuitry (not shown) for controlling the operation of one or more drive modules 4 based on the selection and/or setting of one or more of the potentiometers and/or switches. Control signals from the controller 114 are provided to one or more of the drive modules 2, 16 and 112 via the bus 82 which is routed directly from the control module 4 to each of the drive modules 2, 16 and 112. Synchronization signals are provided via the bus 82 to the auxiliary drive module 8 to coordinate the operation thereof. In this embodiment, the auxiliary drive module 8 is connected to the first drive module 2 which provides the synchronization pulses to the auxiliary drive module 8. Alternatively, as shown in phantom, the auxiliary drive module 8 is connectable to the second drive module 16 to receive synchronization signals therefrom. Any one or plurality of drive modules 2, 16 and 112 can each be provided with an auxiliary drive module 8 as required to provide increased drive power.

With reference to FIG. 9b, bus 82 is utilized to convey control signals from controller 114 to the drive modules 2, 16 and 112 and synchronization signals to the auxiliary drive module 8. In this embodiment, bus 82 is routed sequentially through the first drive module 2, the auxiliary drive module 8, the second drive module 16 and the third drive module 112. The portion of bus 82 extending between the first drive module 2 and the auxiliary drive module 8 is utilized to convey, without limitation, synchronization signals to an auxiliary interface circuit 116 of the auxiliary drive module 8. The auxiliary interface circuit 116 utilizes the synchronization signals and DC power provided via bus 82 to switchably provide power to auxiliary motor 118 in synchronization with the delivery of DC power by the first interface circuit 96a to motor 100a in the first drive module 2.

Figure 10:
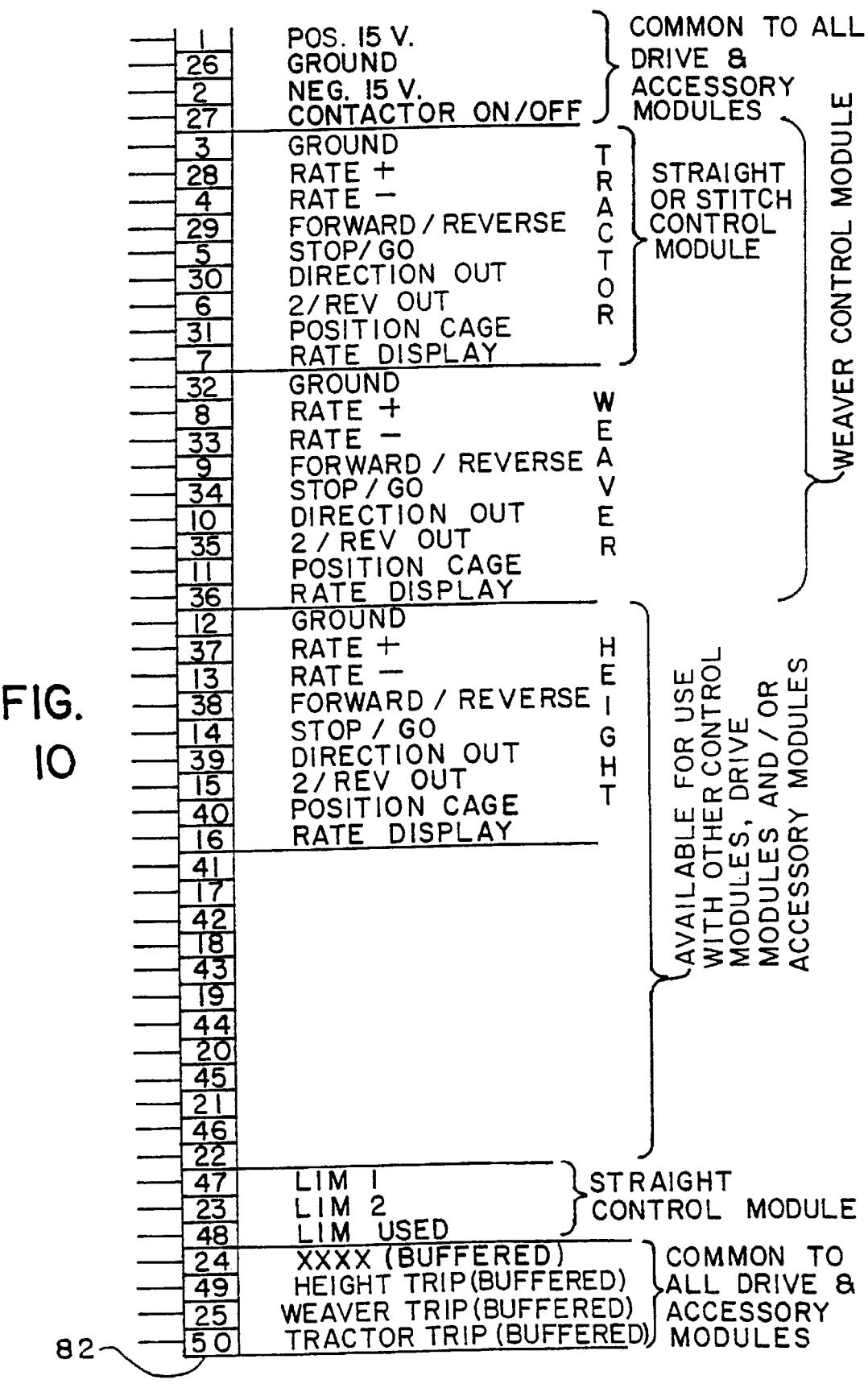
FIG. 10 is a diagrammatic illustration of the arrangement of conductors of the bus utilized to connect control modules to drive modules and accessory modules.

With reference to FIG. 10, in a preferred embodiment, lines 1, 2, 24, 25, 26, 27, 49 and 50 of bus 82 are common to all drive and accessory modules. Lines 1, 2 and 26 are utilized to provide power from the power supply 90 to the control module 4, the second drive module 16 and subsequent drive and/or accessory modules, e.g., the third drive module 112, the auxiliary drive module 8 and/or the accessory module 110, as required. Line 27 is utilized to enable/disable a contactor (not shown) that provides power to, for example, an arc welding tip of the work tool 14. Lines 24, 25, 49 and 50 are utilized to convey trip signals to the control module 4. Lines 3–7 and 28–31 are utilized to convey control signals to the first drive module 2 from one of the straight control module 4a, the weaver control module 4b or stitch control module 4c. Lines 8–11 and 32–36 are utilized to convey control signals from the weaver control module 4b to the second drive module 16. Lines 12–22 and 37–46 are available for conveying control signals from the control module 4 to, for example, the third drive module 112, the auxiliary drive module 8 and/or the accessory module 110. Lastly, lines 23, 46 and 47 are utilized to convey travel limit information to the straight control module 4a. Each interface circuit, e.g., 96a, 96b and 96c, includes circuitry which is responsive to control signals from digital circuitry, e.g., a microprocessor, and/or analog circuitry contained in the controller 114.

The synchronization signals are preferably generated by the interface circuits 96a, 96b or 96c of the drive modules 2, 16 or 112, respectively, to which the auxiliary drive module 8 is attached. Preferably, the portion of bus 82 utilized to convey control signals from the control module 4 to, for example, the first interface circuit 96a via the first connector 6, e.g., lines 3–7 and 28–31, is terminated in the first drive module 2 to avoid unnecessarily extending this portion of the bus 82, and consequently the control signals conveyed thereon. To enable conveyance of the synchronization signals to the auxiliary drive module 8 without needless expansion of the bus 82, the terminated portion of the bus 82 is reconnected in the first drive module 2 to convey synchronization signals from the first interface circuit 96a to the auxiliary drive module 8 via the second connector 10. In this manner, the portion of bus 82 utilized to convey signals between the control module 4 and the drive module 2 is utilized to convey other signals between the drive module 2 and the auxiliary drive module 8.

Figure 11:
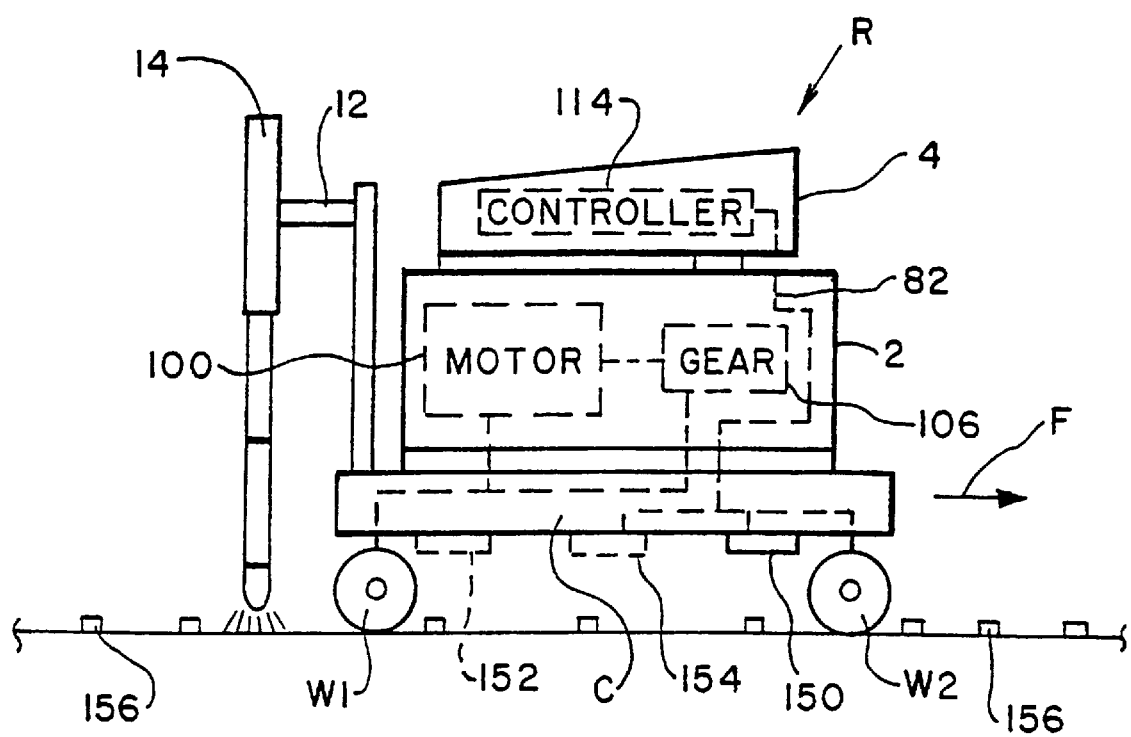
FIG. 11 is a side elevational view of a mobile robotic cutting/welding system in accordance with the present invention.

With reference to FIG. 11, a mobile robotics system R includes carriage C having a pair of wheels W1, one on each side of carriage C, that are controllably driven by the motor 100 via the gear arrangement 106. The carriage C also includes a pair of wheels W2 that are steerable via a steering means 150, such as, for example, a servo motor. The steering means 150 is electrically connectable to the controller 114 of the control module 4 via bus 82. In this embodiment, the controller 114 is programmable, in a known manner, with a desired route or pattern for work tool 14 to traverse. In use, the controller 114 of control module 4 causes motor 100 to propel wheels W1, and hence, carriage C and work tool 14, in a desired direction F. The controller 114 monitors the distance or time traveled and causes the steering means 150 to turn wheels W2 in a desired direction in order to move work tool 14 relative to a workpiece W in accordance with the route information programmed into the controller 114. Wheels W1 may also be steerable via means for steering 152 (shown in phantom) to enable the work tool 14 to be maneuvered with greater freedom than with wheels W1 fixed. In this embodiment, the second drive module 16, the auxiliary drive module 8, the third drive module 112 and/or the accessory module 110 are connectable to the first drive module 2 and controllable by the controller 114 in the manner set forth above in connection with, for example, the embodiment illustrated in FIGS. 8a and 8b.

In another embodiment, the mobile robotics system R includes an optical or magnetic sensor 154 positioned on the carriage C. The optical or magnetic sensor 154 is adapted to detect one or more optical or magnetic markers 156, such as a magnetic strip, positioned along a desired route. The sensor 154 detects the markers 156 and signals the controller 114 to steer one or both pairs of wheels W1 and W2 such that the mobile robotics system R follows the route designated by the markers 156. The use of sensor 154 and markers 156 avoids having to program into controller 114 desired route information.

Figure 12:
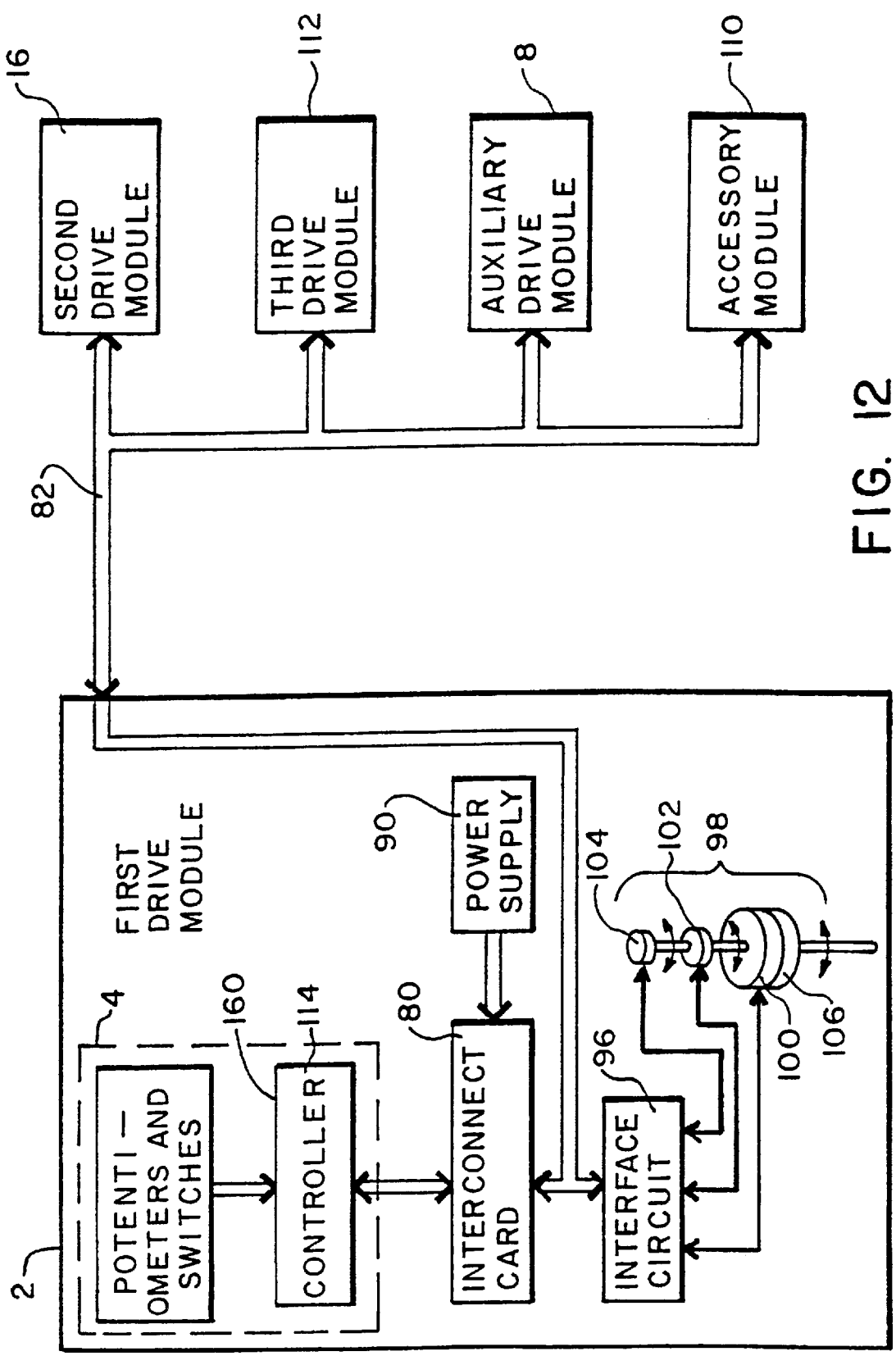
FIG. 12 is a diagrammatic illustration of connections between a first drive module having an integrated controller and a second drive module, a third drive module, an auxiliary drive module and/or an accessory module.

With reference to FIG. 12, in another embodiment, the control module 4 is fixedly attached to the first drive module 2 or, as shown in FIG. 12, the hardware and functions of the control module 4 are integrated into the first drive module 2. In this embodiment, the controller 114 is a multi-function controller where the operation of the controller 114 is adapted as a function of a position of a multi-position switch 160. More specifically, switching the switch 160 to a desired position causes the controller to adapt its operation to coincide with the position of the switch 160. For example, when the switch 160 is in a first position, the controller 114 causes the first drive module 2 to perform the straight welding/cutting operation. When the switch 160 is in a second position and the second drive module 16 is attached to the first drive module 2, the controller 114 synchronizes the operation of the first and second drive modules 2, 16 to perform one or more of the weaving operations illustrated in FIGS. 7a–7d. When the switch 160 is in a third position, the controller 114 causes the first drive module 2 to perform the stitching welding/cutting operation. When the switch 160 is in a fourth or subsequent position, the controller 114 causes the first drive module 2 to function alone or cooperatively with one or more of the second, third, auxiliary and/or accessory module 16, 112, 8, 110, respectively, to implement a desired welding/cutting operation associated with the position of switch 160.

Sufficient switches and potentiometers, e.g., switch 18 and potentiometer 26, can be provided with the first drive module 2 so that the function of each switch and potentiometer remains constant. Alternatively, the functions associated with the switches and potentiometers can be disabled or adapted, in the controller, to correspond to the desired cutting/welding operation. For example, when the switch 160 is in a position selecting the weaving cutting/welding operation, the dwell right and dwell left potentiometers 34, 46 are utilized to control the right dwell time and the left dwell time of a work tool 14. However, when the switch 160 is in a position to select the straight cutting/welding operation, the dwell right and dwell left potentiometers 34, 46 are inoperative. Moreover, when the switch 160 is in a position selecting the stitching cutting/welding operation, the dwell right and dwell left potentiometers 34, 46 are utilized to control, for example, weld time and skip time, respectively. In this manner, the quantity of switches and potentiometers can be minimized.

Preferably, the presence or absence of a second or subsequent drive, auxiliary and/or accessory module 16, 112, 8, 110 can be sensed by the controller 114 via bus 82. Thus, if an operation selected by switch 160 requires, for example, an unconnected second drive module 16, the controller 114 disables the selected function until the second drive module 16 is connected. Audible and/or visual alarms may be provided to indicate that a selected function lacks the necessary module.

The second, third, accessory and/or auxiliary drive modules 16, 112, 110, 8 may include personality modules and/or internal switches or contacts (not shown). These modules and/or switches or contacts enable the controller 114 to detect the modules 16, 112, 110 and/or 8 that are attached to the first drive module 2 and adapt the operation thereof in response to the attachment of various ones or combinations of modules 16, 112, 110, 8. For example, when the second drive module 16 is attached to the first drive module 2, the controller 114 senses the personality module and/or switches or contacts of the second drive module 16 and automatically adapts its operation so that the first and second drive modules 2, 16 perform a weaving cutting/welding operation. In the absence of additional modules 16, 112, 110, 8 attached to the first drive module 2, the controller 114 causes the first drive module 2 to perform a straight cutting/welding operation or a stitch cutting/welding operation as a function of the position of switch 160.

With reference to FIGS. 13a–13b and with continuing reference to FIGS. 8a–8b, in a preferred embodiment, the interface circuit 96, of each drive modules 2, 8, 16, 112 provides its associated motor 100 with a pulse width modulated (PWM) drive signal 130 wherein each pulse has a constant amplitude. The pulses of the PWM drive signal 130 are, preferably, switched at a frequency of 16 kHz and the PWM drive signal 130 has a modulation frequency of 400 Hz. As shown in FIG. 13b, the PWM drive signal 130 provides motor 100 with power having a power profile 132. Each cycle 134 of the PWM drive signal 130, and consequently each corresponding cycle 136 of the power profile 132, includes a first power delivery, segment 138 where power is delivered to the motor and a second segment 140 where no power is delivered to the motor 100.

It has been observed that abrupt on/off switching of power to the motor 100 at the modulation frequency of 400 Hz produces an audible noise having an undesirable intensity or volume. The present invention reduces the volume of this noise by increasing gradually the power delivered to the motor 100 at the beginning 142 of the power delivery segment 138 and by decreasing gradually the power delivered to the motor 100 at the end 144 of the power delivery segment 138. In a preferred embodiment, power delivered to the motor 100 is gradually increased by increasing gradually the width of the pulses at the beginning 142 of the power delivery segment 138 of each PWM cycle 134. Similarly, power delivered to the motor 100 is gradually decreased by decreasing gradually the width of the pulses at the end 144 of the power delivery segment 138 of each PWM cycle 134. Alternatively, if pulse amplitude modulation (PAM) is utilized, the amplitude of the pulses at the beginning 142 of the power delivery segment 138 and at the end 144 of the power delivery segment 138 are adjusted to gradually increase and gradually decrease, respectively, the power delivered to the motor 100. In this manner, power delivered to the motor 100 is increased gradually and decreased gradually at the beginning 142 and end 144 of the power delivery segment 138 of each cycle 136 of the power profile 132.

The motor 100 of each drive module 2, 8, 16, 112 provides a speed sense signal to the interface circuit 96. The interface circuit 96 translates the speed sense signal into a speed of the motor 100 and adjusts the supply of switched DC power to the motor 100 as a function of the deviation between the desired speed, as selected by the speed control potentiometer 26 of the control module 4, and the speed of the motor indicated by the speed sense signal. In a preferred embodiment, the speed sense signal is provided to the interface circuit 96 via the same conductors that provide the PWM drive signals 130 to the motor 100. Specifically, during the second segment 140 of each PWM cycle 134, the controller measures the voltage generated by the inertia of the motor 100, and specifically the rotor of the motor 100, continuing to rotate when power is not being delivered thereto. This rotation causes the motor 100 to operate as a generator thereby producing a voltage that is proportional to the speed, or RPM, of the motor 100. Hence, by sampling the voltage output by the motor 100 when power is not being provided thereto, the interface circuit 96 can determine the speed of the motor 100 and make corresponding adjustments to the PWM signal to cause the motor 100 to rotate at the RPM selected by the setting of the speed control potentiometer, e.g., speed control potentiometer 26 of straight control module 4a.

As can be seen from the foregoing, the present invention provides a modular cutting/welding system wherein different modules can be combined to provide desired cutting/welding operations. In this manner, the present invention avoids the prior art needed to purchase individual cutting/welding systems for each desired pattern, hence, avoiding unnecessary duplication of hardware and functions of the individual cutting/welding systems of the prior art.

The invention has been described with reference to the preferred embodiments. Obvious modifications and alterations will occur to others upon reading and understanding the preceding detailed description. For example, the third drive module 112 and/or the accessory module 110 may be attachable directly to the first drive module 2. A power supply 90 may be included in one or more of the auxiliary drive module 8, the second drive module 16, the third drive module 112, the accessory module 110, and the like as required. Moreover, as shown in FIG. 8*a*, an extension cable 122 can be utilized to remotely connect the control module 4 to the first drive module 2 via the first connector 6. Alternatively, the control module 4 or the first drive module 2 may include an optical or RF receiver 124 for receiving control signals from a remote optical or RF transmitter 126. Hence, the above-described functions of the control module 4 can be adjusted remotely. In yet another embodiment, the control module 4 can be a diagnostic module for testing the operation of component circuitry of one or more of the drive modules 2, 8, 112 and the accessory module 110. It is intended that the invention be construed as including all such modifications and alterations insofar as they come into the scope of the appended claims and the equivalents thereof.

We claim:

1. A drive apparatus for a cutting/welding system, the drive apparatus comprising:
    a first drive module including a housing having a first motor received therein;
    a power supply;
    a first interface circuit connected between the power supply and the first motor;
    a first connector; and
    a control module having a housing, the control module providing control signals to the first interface circuit via the first connector, wherein:
        the first interface circuit supplies power from the power supply to the first motor as a function of the provided control signals; and
        the first connector enables the housing of the control module to be removably attached to the housing of the first drive module.

2. The drive apparatus as set forth in claim 1, further including:
    a second drive module including a housing having a second motor received therein;
    a second interface circuit connected to the second motor; and
    a second connector for removably attaching the housing of the second drive module to the housing of the first drive module and for electrically connecting the power supply to the second interface circuit, wherein:
        the control module provides control signals to the second interface circuit via the first connector; and
        the second interface circuit supplies power from the power supply to the second motor as a function of the control signals provided to the second interface circuit.

3. The drive apparatus as set forth in claim 2, further including:
    a third drive module including a housing having a third motor received therein;
    a third interface circuit connected to the third motor; and
    another second connector for removably attaching the housing of the third drive module to one of the housing of the first drive module and the housing of the second drive module and for electrically connecting the power supply to the third interface circuit, wherein:
        the control module provides control signals to the third interface circuit via the first connector; and
        the third interface circuit provides power from the power supply to the third motor as a function of the control signals provided to the third interface circuit.

4. The drive apparatus as set forth in claim 3, further comprising an accessory module including a housing having a control element received therein, wherein the housing of the accessory module is removably attached to one of the housing of the first drive module, the housing of the second drive module and the housing of the third drive module via one of the second connectors, the control element is electrically connected to the control module via the one of the second connectors and the operation of the interface circuit of the one of the first drive module, the second drive module and the third drive module is controlled as a function of the operation of the control element.

5. The drive apparatus as set forth in claim 4, wherein the control element is a limit switch.

6. The drive apparatus as set forth in claim 2, wherein the first motor is utilized to propel the housing of the first drive module, the housing of the second drive module and the housing of the control module in a first direction and the second motor is utilized to move a work tool coupled thereto in a direction transverse to the first direction.

7. The drive apparatus as set forth in claim 6, wherein the work tool is one of a torch and a laser that is utilized for at least one of cutting and welding a workpiece.

8. The drive apparatus as set forth in claim 1, wherein the control module causes the first interface circuit to propel the first drive module along a track at one of (i) a first speed and (ii) an alternating first speed and second speed.

9. The drive apparatus as set forth in claim 1, wherein the first drive module includes a first position sensor for detecting a rotational position of the first motor.

10. The drive apparatus as set forth in claim 3, wherein at least one of the first interface circuit, the second interface circuit and the third interface circuit provides power to the respective first motor, second motor and third motor during a power delivery segment of the supply of power therefrom, wherein the power delivered to the motor is increased gradually at the beginning of the power delivery segment and is decreased gradually at the end of the power delivery segment.

11. A cutting/welding system comprising:
    a first drive module including a housing having a first connector connected thereto and a first motor received therein for propelling the first drive module in a first direction;
    a power supply;
    a control module having a housing removably attached to the housing of the first drive module via the first connector; and
    a first interface circuit connected between the power supply and the first motor, wherein:
        the control module supplies one or more control signals to the first drive module via the first connector; and
        the first interface circuit controls the delivery of electrical power from the power supply to the first motor as a function of the supplied one or more control signals.

12. The system as set forth in claim 11, further including:
    a second drive module including a housing having received therein a second motor and a second interface circuit which is connected to the second motor, wherein:

the housing of the second drive module is removably attached to the housing of the first drive module via a second connector;

the second interface circuit is electrically connected to the power supply and the control module via the second connector; and the second interface circuit controls the delivery of electrical power from the power supply to the second motor as a function of the control signals supplied to the first drive module.

13. The system as set forth in claim 12, further including:

a third drive module including a housing having received therein a third motor and a third interface circuit which is connected to the third motor, wherein:

the housing of the third drive module is removably attached to one of the housing of the first drive module and the housing of the second drive module via another second connector;

the third interface circuit is electrically connected to the power supply and the control module via the second connector; and the third interface circuit controls the delivery of electrical power from the power supply to the third motor as a function of the control signals supplied to the first drive module.

14. The system as set forth in claim 13, wherein the control module is one of:

(i) a first control module when utilized with the housing of the first drive module;

(ii) a second control module when the housing of the second drive module is removably attached to the housing of the first drive module via the second connector; and (iii) a third control module when the housing of the third drive module is removably attached to the one of the housing of the first drive module and the housing of the of the second drive module via the other second connector.

15. The system as set forth in claim 12, further including a work tool attachable to the second drive module, wherein the second motor causes the work tool to move transverse to the first direction in response to the second interface circuit controlling the delivery of electrical power to the second motor as a function of the control signals supplied by the control module.

16. The system as set forth in claim 12, wherein at least one of the first interface circuit, the second interface circuit and the third interface circuit provides power to the respective first motor, second motor and third motor during a power delivery segment of the supply of power therefrom, wherein the power delivered to the motor is increased gradually at the beginning of the power delivery segment and is decreased gradually at the end of the power delivery segment.

17. The system as set forth in claim 13, wherein:

at least one of the second drive module and the third drive module includes a DC power supply.

18. A mobile robotics system comprising:

a first drive module including a housing having a first connector connected thereto and a first motor received therein for propelling the first drive module in at least one direction;

a power supply; and a control module having a housing removably attached to the housing of the first drive module via the first connector, the control module causing power to be switchably supplied from the power supply to the first motor which responds thereto by propelling the first drive module in the at least one direction.

19. The system as set forth in claim 18, further including a second drive module including a housing having received therein a second motor which is attachable to a work tool for controllably moving the work tool transverse to the at least one direction, wherein the housing of the second drive module is removably attached to the housing of the first drive module via a second connector, and the control module causes power to be switchably supplied from the power supply to the second motor which responds thereto by moving the work tool.

20. The system as set forth in claim 18, further including a second drive module including a housing having received therein a second motor which is attachable to a third drive module including a housing having received therein a third motor which is attachable to a work tool, wherein:

the housing of the first drive module and the housing of the second drive module each have a second connector;

the housing of the second drive module is removably attached to the housing of the second drive module via the second connector thereof;

the housing of the third drive module is removably attached to the housing of the second drive module via the second connector thereof;

the control module causes the power to be switchably supplied from the power supply to the second motor which responds thereto by moving the housing of the third drive module transverse to the at least one direction; and the control module causes power to be switchably supplied from the power supply to the third motor which responds thereto by moving the work tool transverse to the at least one direction and transverse to the direction of movement of the housing of the third drive module by the second drive module.

21. The system as set forth in claim 18, further including a receiver for receiving signals from a remote source, the received signals causing the control module to switchably supply power from the power supply to the first motor as a function of the received signal, wherein the receiver is one of an optical receiver and an RF receiver.

22. The system as set forth in claim 20, wherein at least one of the first motor, the second motor and the third motor is switchably supplied power during a power delivery segment, wherein the power supplied to the motor is increased gradually at the beginning of the power delivery segment and is decreased gradually at the end of the power delivery segment.

23. The system as set forth in claim 20, wherein:

at least one of the second drive module and the third drive module includes a DC power supply.

24. A drive module of a mobile robotic system, the drive module comprising:

a first housing;

a controller connected to the first housing;

a first motor received in the first housing;

a power supply;

a first interface circuit which receives control signals from the controller and which supplies power from the power supply to the first motor as a function of the control signals; and a connector for electrically connecting at least one of the controller and the first interface circuit to at least one of:

(i) a second/auxiliary drive module including a second housing having received therein a second motor and a second interface circuit which receives control signals from the at least one of the controller and the first interface circuit and which supplies power from the power supply to the second motor as a function of the received control signals, with the second housing removably attached to the first housing via the connector; and (ii) an accessory module including a third housing having received therein one or more control elements controllable by the controller, with the third housing removably attached to one of the first housing and the second housing via the connector.

25. The drive module as set forth in claim 24, further including a selection means for adapting the operation of the controller as a function of the setting thereof.

26. The drive module as set forth in claim 24, wherein:
   at least one of the second/auxiliary drive module and the accessory module includes a selection means that is detectable by the controller; and
   the operation of the controller is adapted as a function of the detected selection means.

27. The drive module as set forth in claim 26, wherein the selection means is at least one of a switch and a personality module.

* * * * *